United States Patent
Sueoka et al.

(10) Patent No.: US 10,704,523 B2
(45) Date of Patent: Jul. 7, 2020

(54) CONTROL SYSTEM OF COMPRESSION-IGNITION ENGINE

(71) Applicant: Mazda Motor Corporation, Aki-gun, Hiroshima (JP)

(72) Inventors: Masanari Sueoka, Hiroshima (JP); Atsushi Inoue, Aki-gun (JP); Keiji Maruyama, Hiroshima (JP); Takuya Ohura, Hiroshima (JP); Tomohiro Nishida, Hiroshima (JP); Yusuke Kawai, Hiroshima (JP); Tetsuya Chikada, Higashihiroshima (JP); Tatsuhiro Tokunaga, Aki-gun (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/414,508

(22) Filed: May 16, 2019

(65) Prior Publication Data
US 2019/0360450 A1    Nov. 28, 2019

(30) Foreign Application Priority Data
May 22, 2018    (JP) .................................. 2018-097822

(51) Int. Cl.
*F02D 13/02*    (2006.01)
*F02D 41/30*    (2006.01)
(Continued)

(52) U.S. Cl.
CPC .......... *F02P 5/045* (2013.01); *F02D 13/0207* (2013.01); *F02D 13/0226* (2013.01);
(Continued)

(58) Field of Classification Search
CPC ..... F01L 1/34; F01L 2800/10; F01L 2800/13; F02B 1/08; F02B 1/10; F02D 13/0215;
(Continued)

(56) References Cited

U.S. PATENT DOCUMENTS 6,293,246 B1    9/2001    Tanahashi et al.
6,837,040 B2 *  1/2005    Sonoda ..................... F01L 1/34
                                                   123/295
(Continued)

FOREIGN PATENT DOCUMENTS

| EP | 3418540 A1 | 12/2018 |
|----|-----------|---------|
| JP | 2009108778 A | 5/2009 |
| JP | 6249667 B2 | 12/2017 |

OTHER PUBLICATIONS

Triantopoulos, V., "Experimental and Computational Investigation of Spark Assisted Compression Ignition Combustion Under Boosted, Ultra EGR-Dilute Conditions," Doctor of Philosophy Dissertation, The University of Michigan, Department of Mechanical Engineering, 2018, 238 pages.

(Continued)

*Primary Examiner* — Erick R Solis
(74) *Attorney, Agent, or Firm* — Alleman Hall Creasman & Tuttle LLP

(57) ABSTRACT

A control system of a compression-ignition engine includes an intake variable mechanism and a controller. In a second operating range, the controller controls the intake variable mechanism so that, while partial compression-ignition combustion is performed under an air-fuel ratio (A/F) lean environment, an intake valve open timing takes timing at an advanced side of an exhaust TDC. In a first operating range on a lower load side, the controller controls the intake variable mechanism so that, while the partial compression-ignition combustion is performed under the A/F lean environment, under the same engine speed condition, the intake valve close timing is more retarded within a range on a retarded side of an intake BDC as the engine load decreases, (Continued)

and an absolute value of a change rate of the intake valve close timing to the engine load becomes larger than in the second range.

10 Claims, 19 Drawing Sheets

(51) Int. Cl.
    *F02P 5/04*       (2006.01)
    *F02D 41/00*     (2006.01)
    *F02P 5/15*       (2006.01)

(52) U.S. Cl.
    CPC ..... *F02D 13/0238* (2013.01); *F02D 41/0087* (2013.01); *F02P 5/1502* (2013.01); *F02D 2200/101* (2013.01)

(58) Field of Classification Search
    CPC ............. F02D 13/0219; F02D 13/0261; F02D 41/3029; F02D 41/3041; F02D 2200/101
    USPC ......................................... 123/295, 299, 305
    See application file for complete search history.

(56) References Cited

U.S. PATENT DOCUMENTS

| | | | | |
|---|---|---|---|---|
| 7,337,762 | B2* | 3/2008 | Eng | F01L 1/34 |
| | | | | 123/295 |
| 7,360,523 | B2* | 4/2008 | Sloane | F02B 17/005 |
| | | | | 123/305 |
| 7,431,011 | B2* | 10/2008 | Wagner | F02D 13/0261 |
| | | | | 123/299 |
| 9,140,199 | B2* | 9/2015 | Mond | F02D 23/00 |
| 2002/0029757 | A1* | 3/2002 | Ogawa | F01L 1/34 |
| | | | | 123/295 |
| 2003/0062023 | A1* | 4/2003 | Fuerhapter | F01L 1/34 |
| | | | | 123/306 |
| 2009/0093946 | A1* | 4/2009 | Yamashita | F01L 1/08 |
| | | | | 701/103 |
| 2014/0283800 | A1 | 9/2014 | Hellstrom et al. | |
| 2018/0334998 | A1* | 11/2018 | Inoue | F02B 23/0696 |
| 2019/0360449 | A1* | 11/2019 | Inoue | F02D 41/005 |

OTHER PUBLICATIONS

Xie, H et al., "Study on spark assisted compression ignition (SACI) combustion with positive valve overlap at medium-high load," Journal of Applied Energy, Aug. 3, 2012, 12 pages.

Szybist, J et al., "Load Expansion of Stoichiometric HCCI Using Spark Assist and Hydraulic Valve Actuation," SAE International, Oct. 25, 2010, 15 pages.

Gerow, M. et al., "A Comparison of Valving Strategies Appropriate for Multi-Mode Combustion Within a Downsized Boosted Automotive Engine Part B: Mid Load Operation Within the SACI Combustion Regime," Proceedings of the ASME 2013 Internal Combustion Engine Division Fall Technical Conference, Oct. 13, 2013, Dearborn, Michigan, 14 pages.

European Patent Office, Extended European Search Report Issued in Application No. 19174806.0, Oct. 22, 2019, Germany, 14 pages.

* cited by examiner

CONTROL SYSTEM OF COMPRESSION-IGNITION ENGINE

TECHNICAL FIELD

The present disclosure relates to a control system of a compression-ignition engine, which is capable of carrying out a partial compression-ignition combustion in which a mixture gas within a cylinder is partially combusted by spark-ignition (SI combustion) and then the remaining mixture gas is combusted by self-ignition (CI combustion).

BACKGROUND OF THE DISCLOSURE

In recent years, Homogeneous-Charge Compression Ignition (HCCI) combustion in which a gasoline fuel mixed with air combusts by self-ignition inside a fully-compressed combustion chamber has attracted attention. Since the HCCI combustion is a form in which the mixture gas combusts simultaneously without flame propagation, the combusting speed of the mixture gas is faster than SI combustion (jump-spark-ignition combustion) which is adopted by normal gasoline engines. Therefore, it is said that the HCCI combustion is very advantageous in terms of thermal efficiency. However, it is necessary to solve various problems of automobile engines which require an improvement in thermal efficiency, and engines which operate by a suitable HCCI combustion have not yet been put into practical use. That is, although the engines mounted on automobiles vary largely in the operating state and the environmental condition, the HCCI combustion has a problem in which a combustion start timing of the mixture gas (timing at which the mixture gas self-ignites) changes largely by external factors, such as temperature, and also has a problem in which control during a transition operation in which load changes suddenly is difficult.

Thus, it is proposed that, without combusting all of the mixture gas by self-ignition, a portion of the mixture gas is combusted by the spark ignition using a spark plug. That is, a portion of the mixture gas is forcibly combusted by flame propagation (SI combustion) triggered by the spark ignition, and the remaining mixture gas is combusted by self-ignition (CI combustion). Hereinafter, such combustion is referred to as "SPCCI (SPark Controlled Compression-Ignition) combustion."

JP2009-108778A is known as one example of an engine adopting a concept similar to the SPCCI combustion. This engine carries out flame-propagation combustion by the spark ignition of a stratified mixture gas formed around a spark plug (ignition plug) by a supplementary fuel injection and then carries out a main fuel injection into a combustion chamber which reaches a high temperature by the effect of the flame-propagation combustion (flame) to cause the fuel injected by the main fuel injection to combust by self-ignition.

The CI combustion of the SPCCI combustion takes place when an in-cylinder temperature (temperature inside a cylinder) reaches an ignition temperature of mixture gas which is defined by the composition of the mixture gas. Fuel efficiency can be maximized if the CI combustion occurs by the in-cylinder temperature reaching the ignition temperature near a compression top dead center. The in-cylinder temperature increases with an increase in an in-cylinder pressure (pressure inside the cylinder). The in-cylinder pressure on the compression stroke when the SPCCI combustion is carried out is increased by compression work of a piston and combustion energy of the SI combustion. Therefore, if the flame propagation of the SI combustion is not stable, increasing amounts of the in-cylinder pressure and the in-cylinder temperature resulting from the SI combustion decreases, and it becomes difficult to raise the in-cylinder temperature to the ignition temperature. If the in-cylinder temperature does not fully rise to the ignition temperature, more of the mixture gas combust by flame propagation with a long combustion period because of a reduction in the amount of the mixture gas which carries out the CI combustion, or the CI combustion takes place when the piston descends considerably, and as a result, fuel efficiency decreases. Thus, in order to cause the stable CI combustion to maximize fuel efficiency, it is important to stabilize the flame propagation of SI combustion.

In addition, the SPCCI combustion also requires improvements in fuel efficiency and exhaust performance, by turning the combustion chamber into an air-fuel ratio (A/F) lean environment in which an air-fuel ratio which is a ratio of air to fuel inside the cylinder becomes higher than a stoichiometric air-fuel ratio. However, in such an A/F lean environment, it becomes difficult to stabilize the flame propagation of the SI combustion.

SUMMARY OF THE DISCLOSURE

The present disclosure is made in view of the above situations, and one purpose thereof is to provide a control system of a compression-ignition engine, which can realize a suitable partial compression-ignition combustion under an A/F lean environment.

In order to address the situations, the present inventors diligently examined more suitable controls of an intake valve by changing an open timing of the intake valve, while causing the SPCCI combustion with various engine loads. As a result, the present inventors determined that a stable SPCCI combustion can be realized even under the A/F lean environment by retarding a close timing of the intake valve at a lower engine load side according to a reduction in the engine load, and increasing a rate of change in the close timing of the intake valve to the engine load.

According to one aspect of the present disclosure, a control system of a compression-ignition engine is provided. The engine includes a cylinder, an intake passage, an exhaust passage, an intake port communicating the intake passage to the cylinder, an intake valve configured to open and close the intake port, an exhaust port communicating the exhaust passage to the cylinder, an exhaust valve configured to open and close the exhaust port, an injector configured to inject fuel into the cylinder, and a spark plug configured to ignite a mixture gas containing the fuel injected by the injector and air. The engine executes partial compression-ignition combustion in which the mixture gas is spark-ignited with the spark plug to be partially combusted by spark ignition (SI) combustion and the rest of the mixture gas self-ignites to be combusted by compression ignition (CI) combustion. The control system includes an intake variable mechanism configured to change an open timing and a close timing of the intake valve, and a controller including a processor configured to control parts of the engine, including the intake variable mechanism and the spark plug. The controller controls the intake variable mechanism so that, when the engine is operated in a given second operating range, an air-fuel ratio (A/F) lean environment where an air-fuel ratio that is a ratio of air to fuel in the cylinder becomes higher than a stoichiometric air-fuel ratio is formed, and the open timing of the intake valve is at an advanced side of an exhaust top dead center, while causing the spark plug to perform the spark ignition at a given timing so that the mixture gas combusts by the partial compression-ignition combustion. The controller controls the intake variable mechanism so that, when the engine is operated in a first operating range where the engine load is lower than that of the second operating range, the A/F lean environment where the air-fuel ratio becomes higher than the stoichiometric air-fuel ratio is formed, while causing the spark plug to perform the spark ignition at the given timing so that the mixture gas combusts by the partial compression-ignition combustion, and the controller controls the intake variable mechanism so that, under the same engine speed condition, the close timing of the intake valve is more retarded within a range on a retarded side of an intake bottom dead center as the engine load decreases, and an absolute value of a rate of change in the close timing of the intake valve to the engine load becomes larger than an absolute value of the rate of change in the second operating range.

According to this configuration, in the first operating range and the second operating range, a stable partial compression-ignition combustion (SPCCI combustion) is performed, while the air-fuel ratio is set higher than the stoichiometric air-fuel ratio. Therefore, fuel efficiency can certainly be improved.

Note that the SI combustion tends to be unstable if the air-fuel ratio is high as described above. If the SI combustion becomes unstable, an amount of mixture gas which carries out the CI combustion decreases and a large amount of the mixture gas combusts by flame propagation with a long combustion period, or the CI combustion takes place when the piston descends considerably, and as a result, fuel efficiency decreases.

In this regard, according to this configuration, in the second operating range, the open timing of the intake valve is set at a timing on the advanced side of the exhaust top dead center to open the intake valve in the middle of an exhaust stroke. Therefore, burnt gas inside the cylinder is drawn out to the intake port, and this burnt gas can then flow into the cylinder, to increase the amount of burnt gas (internal EGR gas) which remains inside the cylinder. In the second operating range, the temperature of burnt gas is also high in connection with the high engine load. Therefore, by increasing the amount of burnt gas remained in the cylinder in the second operating range as described above, the temperature in the cylinder is increased and the stability of the SI combustion is improved, which results in realizing the suitable CI combustion, that is the suitable SPCCI combustion.

On the other hand, in the first operating range where the engine load is low, the temperature of burnt gas is low and the increasing effect of the temperature in the cylinder by leaving the burnt gas in the cylinder is small. In addition, in the first operating range, the velocity of the flame propagation tends to be slower in connection with the low engine load. If a large amount of burnt gas, that is, inert gas, is left inside the cylinder in such a state, the velocity of the flame propagation may be even slower and the SI combustion may become unstable.

In this regard, according to this configuration, in the first operating range, the close timing of the intake valve is controlled to be more retarded within the range on the retarded side of the intake bottom dead center as the engine load decreases. That is, in the first operating range, the retarded amount of the close timing of the intake valve from the intake bottom dead center is increased as the engine load decreases. Further, the rate of change in the close timing of the intake valve in the first operating range is increased (making it larger than the rate of change in the second operating range) to fully increase the retarded amount of the close timing of the intake valve from the intake bottom dead center when the engine load is low. Therefore, in the first operating range, the amount of air blown back to the intake port from the cylinder can be increased to reduce the air-fuel ratio in the cylinder (richer), thereby increasing the stability of the SI combustion and realizing the suitable CI combustion and SPCCI combustion. Moreover, in the high load side of the first operating range, the relatively large amount of hot burnt gas remains in the cylinder to increase the stability of the SI combustion and realize the suitable CI combustion and SPCCI combustion.

The intake variable mechanism may simultaneously change the open timing and the close timing of the intake valve.

The controller may control the intake variable mechanism so that the open timing of the intake valve is maintained at or near a most advanced timing with respect to the exhaust top dead center in the second operating range, regardless of the engine load.

According to this configuration, in the second operating range, a large amount of burnt gas can be certainly retained inside the cylinder, and combustion stability can certainly be improved.

The control system may further include an exhaust variable mechanism configured to change a close timing of the exhaust valve. The controller may control the exhaust variable mechanism so that, when the engine is operated in a third operating range set as a low load side of the operating range where the partial compression-ignition combustion under the A/F lean environment is performed, the close timing of the exhaust valve is more advanced within a range on a retarded side of the exhaust top dead center as the engine load decreases.

When the close timing of the exhaust valve is advanced within the range on the retarded side of the exhaust top dead center, the amount of burnt gas re-introduced into the cylinder after being drawn out to the exhaust port decreases. Therefore, according to this configuration, in the range on the low load side where the combustion easily becomes unstable, the amount of burnt gas which remains in the cylinder is reduced to promote a reaction of fuel and air. Therefore, combustion stability can further be improved. Moreover, in the range, when the engine load is relatively high and the temperature of the burnt gas is relatively high, the burnt gas remains moderately in the cylinder, thereby increasing the in-cylinder temperature to improve combustion stability.

The controller may control the exhaust variable mechanism so that, when the engine is operated in a fourth operating range where the engine load is higher than the third operating range, of the operating range where the partial compression-ignition combustion under the A/F lean environment is performed, the close timing of the exhaust valve is maintained at a substantially constant timing on the retarded side of the exhaust top dead center, regardless of the engine load.

According to this configuration, in the range where the engine load is high and the temperature of the burnt gas is high, the burnt gas drawn out to the exhaust port can be re-introduced into the cylinder, and more burnt gas at high temperature can be retained in the cylinder. Therefore, the in-cylinder temperature is increased and combustion stability can certainly be improved in the range.

The controller may control the exhaust variable mechanism so that, when the engine is operated in a fifth operating range where the engine load is higher than the fourth operating range, of the operating range where the partial compression-ignition combustion under the A/F lean environment is performed, the close timing of the exhaust valve is more advanced within a range on the retarded side of the exhaust top dead center as the engine load increases.

According to this configuration, in the range where the engine load is higher and the in-cylinder temperature easily rises, the amount of burnt gas remaining inside the cylinder is reduced, as the engine load increases and accordingly the temperature of burnt gas increases. Therefore, on the relatively lower load side of this range, the combustion stability improves by the burnt gas, whereas, on the higher load side, the in-cylinder temperature is prevented from becoming excessively high and CI combustion is prevented from starting at an excessively early timing.

The first operating range and the second operating range may be adjacent to each other in an engine load direction, bordering on a given first reference load. The third operating range and the fourth operating range may be adjacent to each other in the engine load direction, bordering on a given second reference load. The first reference load and the second reference load may be set substantially identical.

According to this configuration, in the first to fourth operating ranges, by adjusting the open timings and close timings of the intake valve and the exhaust valve, suitable SPCCI combustion is realized more reliably.

The cylinder may include a plurality of cylinders. The controller may carry out, when the engine is operated in a reduced cylinder range set as a low load side of the first operating range, and a preset reduced-cylinder operation executing condition is satisfied, a reduced-cylinder operation in which only some of the cylinders are operated by injecting fuel from the injector into the cylinders, while suspending the fuel injection into the remaining cylinders, and control the intake variable mechanism so that, when the reduced-cylinder operation is carried out within a lower load range of the reduced cylinder range, the close timing of the intake valve is fixed, regardless of the engine load.

When the reduced-cylinder operation is carried out, since the fuel amount to be supplied to the cylinder is increased more than in an all-cylinder operation, combustion stability is improved by increasing the temperature of the operating cylinder. Therefore, according to this configuration, by carrying out the reduced-cylinder operation when operating in the reduced cylinder range set to the low engine load side of the first operating range, the combustion is stabilized.

In this way, when carrying out the reduced-cylinder operation, since the combustion stability can be improved by reducing the number of operating cylinders, the necessity of adjusting the close timing of the intake valve in order to increase the combustion stability becomes less. In this regard, according to this configuration, when carrying out the reduced-cylinder operation in the low load side of the reduced cylinder range, the close timing of the intake valve is set constant regardless of the engine load. Therefore controllability of the intake valve improves. In a case where the open timing of the intake valve needs to be changed largely with the change of the engine load, the open timing of the intake valve may be shifted from the suitable timing due to a response delay of the intake variable mechanism, etc.; however, that can be avoided with this configuration.

The controller may control the exhaust variable mechanism configured to change a close timing of the exhaust valve so that, when the reduced-cylinder operation is carried out within a lower load range of the reduced cylinder range, the close timing of the exhaust valve is fixed, regardless of the engine load.

According to this configuration, when the reduced-cylinder operation is carried out within the lower load range of the reduced cylinder range, controllability of the exhaust valve improves.

The controller may set a target SI ratio that is a target value of a ratio of an amount of heat generation by the SI combustion to a total amount of heat generation in one cycle according to an engine operating condition when performing the partial compression-ignition combustion, and set an ignition timing of the spark plug based on the target SI ratio.

By adjusting the ignition timing so as to realize the SPCCI combustion conforming to the target SI ratio, for example, the ratio of the CI combustion can be increased (i.e., the SI ratio is lowered). This leads to improving thermal efficiency by the SPCCI combustion as much as possible.

BRIEF DESCRIPTION OF DRAWINGS

FIG. 10A is a graph at a first speed, FIG. 10B is a graph at a second speed, FIG. 10C is a graph at a third speed, and FIG. 10D is a graph at a fourth speed.

DETAILED DESCRIPTION OF THE DISCLOSURE (1) Entire Configuration of Engine

Figure 1:
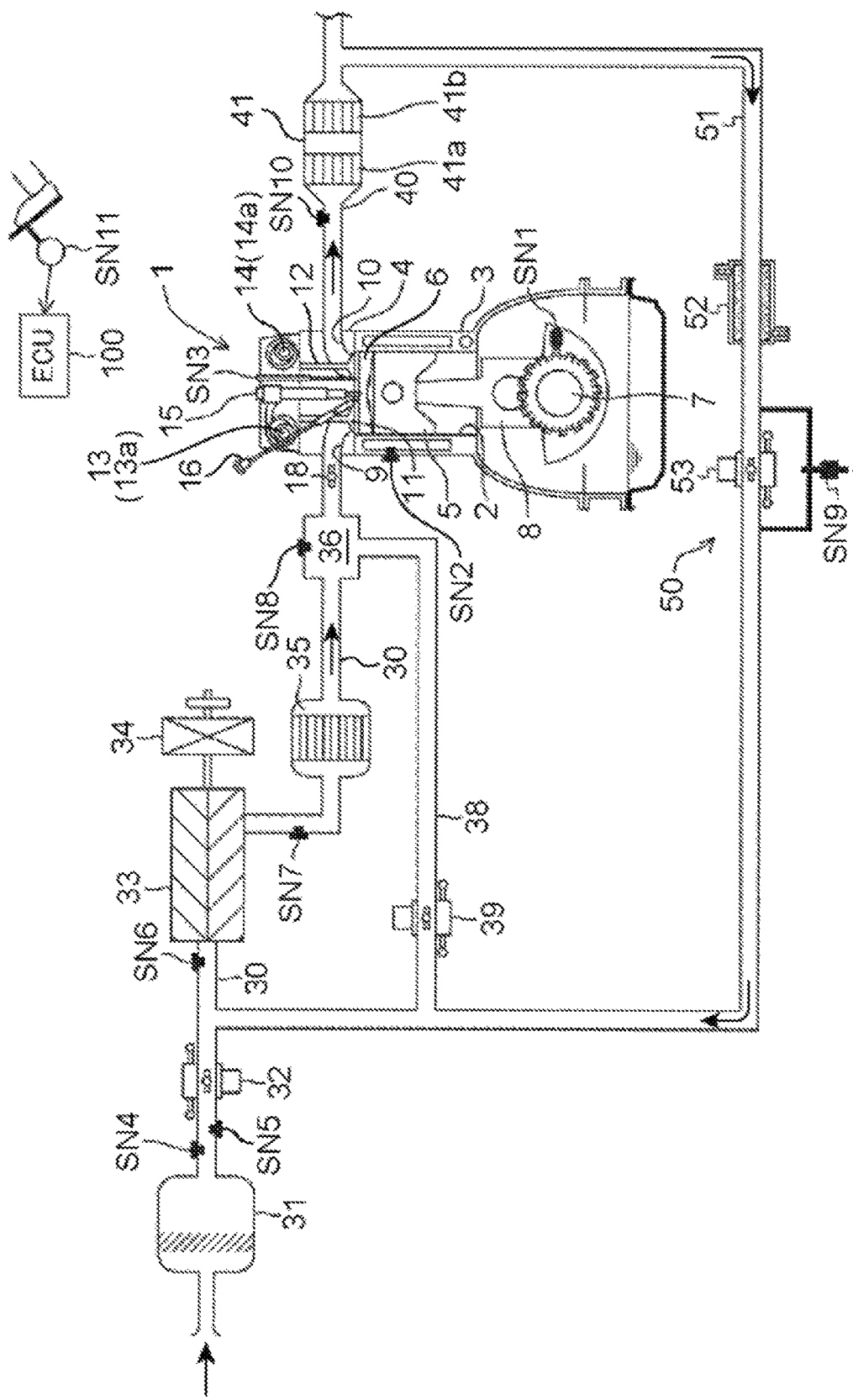
FIG. 1 is a system diagram schematically illustrating the entire configuration of a compression-ignition engine according to one embodiment of the present disclosure.
Figure 2:
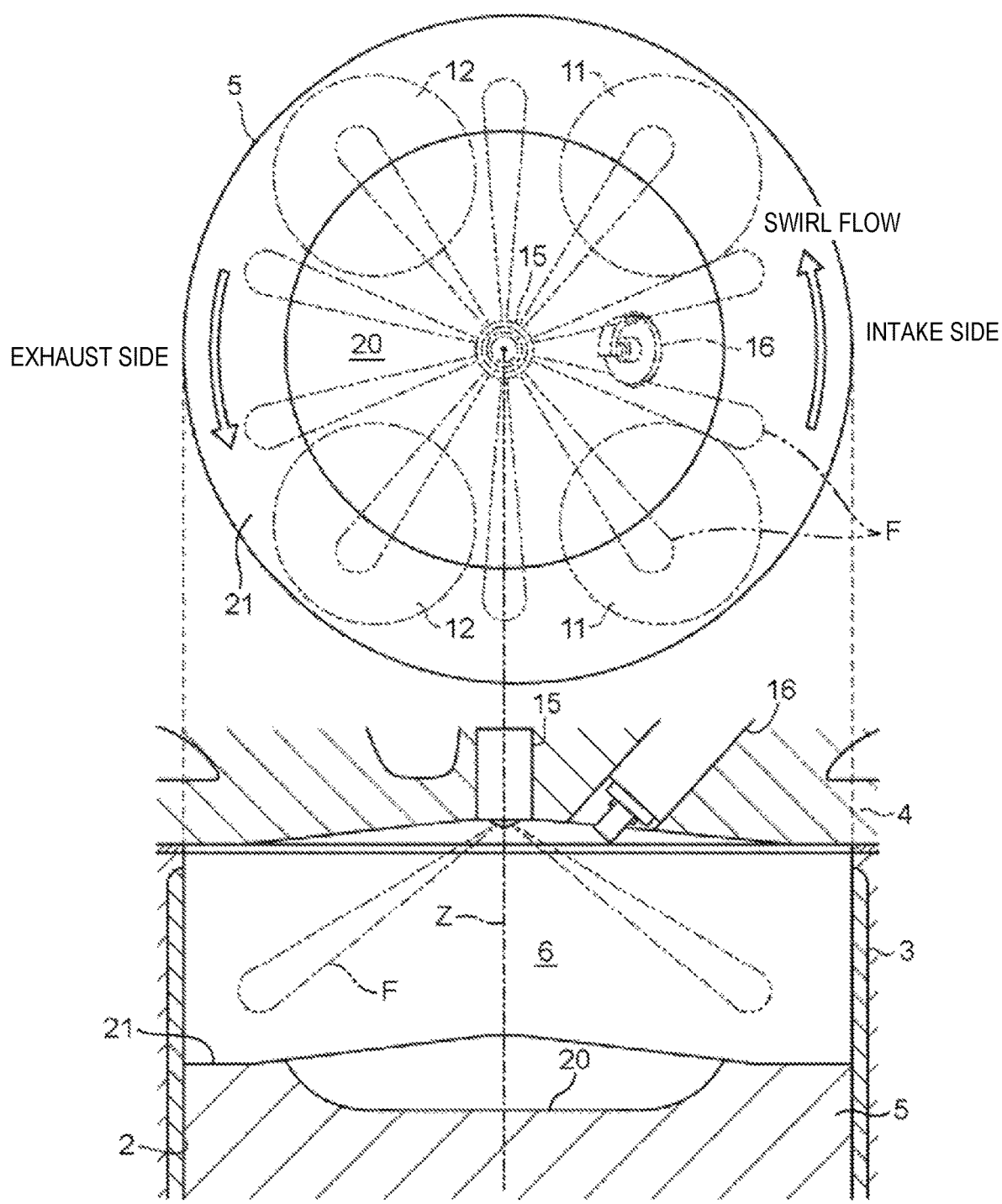
FIG. 2 is a view illustrating both a cross-sectional view of an engine body and a plan view of a piston.

FIGS. 1 and 2 are views illustrating a desirable embodiment of a compression-ignition engine (hereinafter, simply referred to as "the engine") to which a control system of the present disclosure is applied. An engine illustrated in these figures is a four-cycle gasoline direct-injection engine mounted on a vehicle, as a power source for propulsion, and includes an engine body 1, an intake passage 30 through which intake air introduced into the engine body 1 flows, an exhaust passage 40 through which exhaust gas discharged from the engine body 1 flows, and an external exhaust gas recirculation (EGR) system 50 which recirculates to the intake passage 30 part of the exhaust gas flowing through the exhaust passage 40.

The engine body 1 includes a cylinder block 3 where a cylinder 2 is formed therein, a cylinder head 4 attached to an upper surface of the cylinder block 3 so as to cover the cylinder 2 from above, and a piston 5 reciprocatably inserted in the cylinder 2. Although the engine body 1 is typically of a multi-cylinder type having a plurality of cylinders (for example, four cylinders), the following description may be focused on only one cylinder 2 in order to simplify the description.

A combustion chamber 6 is defined above the piston 5, and fuel of which the main component is gasoline is supplied to the combustion chamber 6 by injection from an injector 15 described later. Then, the supplied fuel combusts inside the combustion chamber 6 while being mixed with air, and the piston 5 descends by an expansion force caused by the combustion reciprocates in the up-and-down direction. Note that the fuel injected into the combustion chamber 6 may contain at least gasoline as the main component, and for example, may also contain a subcomponent, such as bio-ethanol, in addition to gasoline.

Below the piston 5, a crankshaft 7 which is an output shaft of the engine body 1 is provided. The crankshaft 7 is coupled to the piston 5 through a connecting rod 8, and is rotated about a center axis thereof according to the reciprocating motion (up-and-down motion) of the piston 5.

A geometric compression ratio of the cylinder 2, i.e., a ratio with the volume of the combustion chamber 6 when the piston 5 is located at a bottom dead center to the volume of the combustion chamber 6 when the piston 5 is located at a top dead center is set to 13 or higher and 30 or lower, and preferably, 14 or higher and 18 or lower, as a suitable value for SPCCI (SPark Controlled Compression Ignition) combustion described later. In more detail, the geometric compression ratio of the cylinder 2 is desirably set to 14 or higher and 17 or lower in a case of a regular gasoline type which uses gasoline fuel of which the octane number is about 91, and 15 or higher and 18 or lower in a case of a high octane type which uses gasoline fuel of which the octane number is about 96.

The cylinder block 3 is provided with a crank angle sensor SN1 which detects a rotational angle of the crankshaft 7 (crank angle) and an engine speed of the crankshaft 7 (engine speed), and a water temperature sensor SN2 which detects temperature of coolant which flows inside the cylinder block 3 and the cylinder head 4 (engine water temperature).

The cylinder head 4 is provided with an intake port 9 which opens to the combustion chamber 6 and communicates with the intake passage 30, an exhaust port 10 which opens to the combustion chamber 6 and communicates with the exhaust passage 40, an intake valve 11 which opens and closes the intake port 9, and an exhaust valve 12 which opens and closes the exhaust port 10. Note that as illustrated in FIG. 2, the valve type of the engine of this embodiment is a four-valve type with two intake valves and two exhaust valves. That is, the intake port 9 has a first intake port 9A and a second intake port 9B, and the exhaust port 10 has a first exhaust port 10A and a second exhaust port 10B (see FIG. 3). One intake valve 11 is provided to each of the first intake port 9A and the second intake port 9B, and one exhaust valve 12 is provided to each of the first exhaust port 10A and the second exhaust port 10B.

Figure 3:
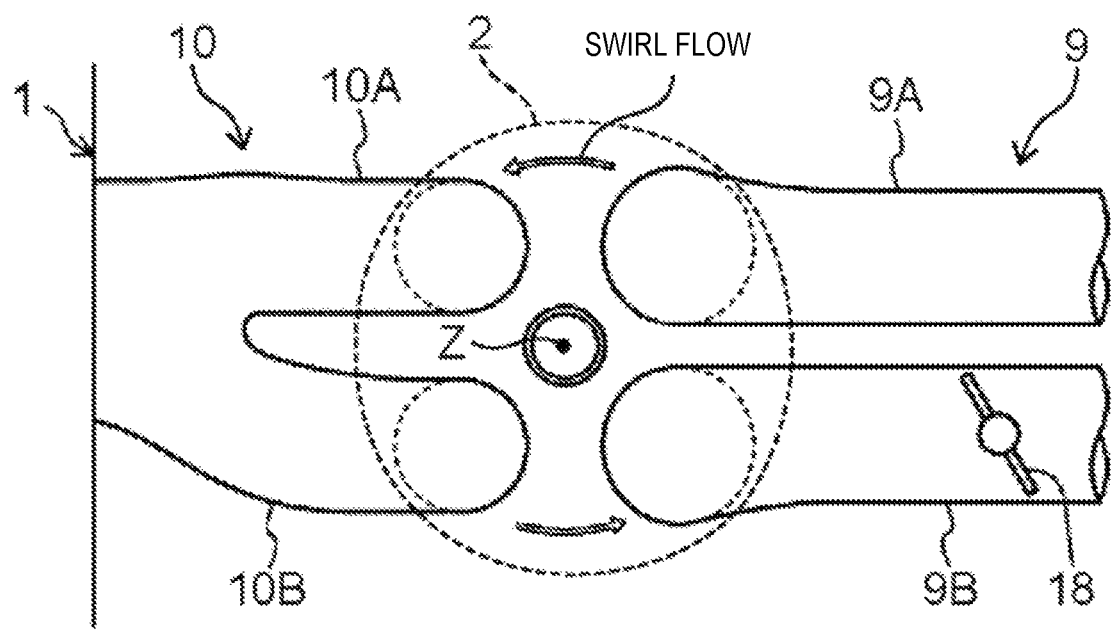
FIG. 3 is a plan view schematically illustrating a structure of a cylinder, and intake and exhaust systems nearby.

As illustrated in FIG. 3, a swirl valve 18 which can open and close is provided to the second intake port 9B. The swirl valve 18 is provided only to the second intake port 9B, and is not provided to the first intake port 9A. Since a ratio of the intake air flowing into the combustion chamber 6 from the first intake port 9A which is not provided with the swirl valve 18 increases when the swirl valve 18 is driven in a closing direction, a rotational flow which circles around a cylinder axis Z (a center axis of the combustion chamber 6), i.e., a swirl flow, can be strengthened. On the contrary, the swirl flow can be weakened when the swirl valve 18 is driven in an opening direction. Note that the intake port 9 of this embodiment is a tumble port which can form a tumble flow (vertical vortex). Thus, the swirl flow formed when the swirl valve 18 is closed turns into an inclined swirl flow mixed with the tumble flow.

The intake valve 11 and the exhaust valve 12 are driven by valve operating mechanisms 13 and 14 including a pair of cam shafts disposed in the cylinder head 4, in an interlocked manner with the rotation of the crankshaft 7, so that the valves are opened and closed.

An intake variable valve timing mechanism (VVT) 13a configured to change an open timing and a close timing of the intake valve 11 is built into the valve operating mechanism 13 for the intake valve 11. Similarly, an exhaust VVT 14a configured to change an open timing and a close timing of the exhaust valve 12 is built into the valve operating mechanism 14 for the exhaust valve 12. The intake VVT 13a (exhaust VVT 14a) is a so-called phase-variable mechanism, which changes the open timing and the close timing of the intake valve 11 (exhaust valve 12) simultaneously and by the same amount. That is, the open timing and the close timing of the intake valve 11 (exhaust valve 12) are changed in a state in which the valve opening period is fixed to a certain length. The intake VVT 13a described above is one example of an "intake variable mechanism", and the exhaust VVT 14a is one example of an "exhaust variable mechanism."

The open timing of the intake valve 11 can be changed between a given timing on the retarded side of a top dead center (TDC) of an exhaust stroke and a given timing at the advanced side of the exhaust TDC. The valve opening period of the intake valve 11 is set so that a close timing IVC of the intake valve 11 becomes a timing on the retarded side of a bottom dead center (BDC) of an intake stroke, when the open timing IVO of the intake valve 11 is set at the maximum advanced timing (the most advanced timing within the possible timing range). In connection with this, the close timing IVC of the intake valve 11 is changed within a range on the retarded side of the intake BDC. An open timing EVO of the exhaust valve 12 can be changed between a given timing at the advanced side of the exhaust TDC and a given timing on the retarded side of the exhaust TDC.

Note that the open timing of the intake valve 11 (exhaust valve 12)" described herein does not refer to a timing at which a valve lift becomes greater than zero (0), but a timing at which a flow of gas between the intake port 9 (exhaust port) and the combustion chamber 6 via the intake valve 11 (exhaust valve 12) begins to become substantially possible. For example, the valve lift of the intake valve 11 (exhaust valve 12) rises rapidly after it is lifted at a substantially constant speed from a seated state (i.e., after passing a so-called "ramp part"), and the open timing of the intake valve 11 (exhaust valve 12) in this specification and the claims refers to the timing at which the valve lift rises rapidly. This timing is when the valve lift of the intake valve 11 (exhaust valve 12) becomes about 0.14 mm, for example. Similarly, the close timing of the intake valve 11 (exhaust valve 12) described herein is not a timing at which the valve lift of the intake valve 11 (exhaust valve 12) becomes zero, but is a timing at which a flow of gas between the intake port 9 (exhaust-valve port) and the combustion chamber 6 via the intake valve 11 (exhaust valve 12) substantially stops. For example, the valve lift of the intake valve 11 (exhaust valve 12) falls gently at a substantially constant speed toward zero after it falls relatively quickly (that is, a so-called ramp part is set), and the open timing of the intake valve 11 (exhaust valve 12) described herein is a timing at which the valve lift begins to fall at the fixed speed toward zero. This timing is when the valve lift of the intake valve 11 (exhaust valve 12) becomes about 0.14 mm, for example.

The cylinder head 4 is provided with the injector 15 which injects fuel (mainly gasoline) into the combustion chamber 6, and a spark plug 16 which ignites mixture gas which is a mixture of the fuel injected into the combustion chamber 6 from the injector 15 with air introduced into the combustion chamber 6. The cylinder head 4 is further provided with an in-cylinder pressure sensor SN3 which detects pressure of the combustion chamber 6 (hereinafter, may also be referred to as "the in-cylinder pressure").

As illustrated in FIG. 2, a cavity 20 is formed on a crown surface of the piston 5 by denting a relatively wide area, including a center part thereof, to the opposite side from the cylinder head 4 (downwardly). Moreover, a squish part 21 comprised of an annular flat surface is formed in the crown surface of the piston 5, radially outward of the cavity 20.

The injector 15 is a multi-port injector having a plurality of nozzle ports at its tip portion, and the fuel is injected radially from the plurality of nozzle ports. "F" in FIG. 2 indicates fuel spray injected from the respective nozzle ports, and the injector 15 has a total of ten nozzle ports formed at equal intervals in the circumferential direction in the example of FIG. 2. The injector 15 is located in a center portion of a ceiling surface of the combustion chamber 6 so that its tip portion opposes to a center portion (the center of the bottom of the cavity 20) of the crown surface of the piston 5.

The spark plug 16 is disposed at a position slightly offset to the intake side with respect to the injector 15. The position of a tip portion (electrode part) of the spark plug 16 overlaps with the cavity 20 in the plan view.

As illustrated in FIG. 1, the intake passage 30 is connected to one of side surfaces of the cylinder head 4 so as to communicate with the intake port 9. Air (fresh air) taken in from an upstream end of the intake passage 30 is introduced into the combustion chamber 6 through the intake passage 30 and the intake port 9.

The intake passage 30 is provided with, in the order from the upstream side, an air cleaner 31 which removes foreign matter contained in the intake air, a throttle valve 32 which can be opened and closed to adjust a flow rate of intake air, a booster 33 which boosts the intake air while compressing the intake air, an intercooler 35 which cools the intake air compressed by the booster 33, and a surge tank 36.

An airflow sensor SN4 which detects the flow rate of the intake air, first and second intake air temperature sensors SN5 and SN7 which detect temperature of the intake air, and the first and second intake air pressure sensors SN6 and SN8 which detect pressure of the intake air are provided in various parts of the intake passage 30. The airflow sensor SN4 and the first intake air temperature sensor SN5 are provided in a portion of the intake passage 30 between the air cleaner 31 and the throttle valve 32, and detect the flow rate and the temperature of intake air which passes through this portion. The first intake air pressure sensor SN6 is provided to a portion of the intake passage 30 between the throttle valve 32 and the booster 33 (downstream side of a connection port of an EGR passage 51 described later), and detects the pressure of intake air passing through this portion. The second intake air temperature sensor SN7 is provided to a portion of the intake passage 30 between the booster 33 and the intercooler 35, and detects the temperature of intake air passing through this portion. The second intake air pressure sensor SN8 is provided in the surge tank 36, and detects the pressure of intake air in the surge tank 36.

The booster 33 is a mechanical booster (supercharger) which is mechanically coupled to the engine body 1. Although the specific type of the booster 33 is not particularly limited, for example, any known booster, such as a Lysholm, Roots type, or centrifugal type, may be used as the booster 33.

Between the booster 33 and the engine body 1, an electromagnetic clutch 34 which can be electrically switched between operation modes of "engaged" and "disengaged" is provided. When the electromagnetic clutch 34 is engaged, a driving force is transmitted from the engine body 1 to the booster 33, thereby becoming a boosting state where boost by the booster 33 is performed. On the other hand, when the electromagnetic clutch 34 is disengaged, the transmission of the driving force is interrupted to enter a non-boosting state where the boost by the booster 33 is stopped.

The intake passage 30 is provided with a bypass passage 38 which bypasses the booster 33. The bypass passage 38 connects the surge tank 36 with the EGR passage 51 described later. The bypass passage 38 is provided with a bypass valve 39 which can be opened and closed.

The exhaust passage 40 is connected to the other side surface of the cylinder head 4 so as to communicate with the exhaust port 10. Burnt gas (exhaust gas) generated in the combustion chamber 6 is discharged outside through the exhaust port 10 and the exhaust passage 40.

The exhaust passage 40 is provided with a catalytic converter 41. The catalytic converter 41 contains a three-way catalyst 41a which purifies hazardous components (HC, CO, and $NO_x$) contained in exhaust gas which flows through the exhaust passage 40, and a GPF (Gasoline Particulate Filter) 41b which captures particulate matter (PM) contained in the exhaust gas. Note that another catalytic converter which contains suitable catalysts, such as a three-way catalyst and a NOR catalyst, may be additionally provided downstream of the catalytic converter 41.

A linear $O_2$ sensor SN10 which detects the concentration of oxygen contained within the exhaust gas is provided in a portion of the exhaust passage 40 upstream of the catalytic converter 41. The linear $O_2$ sensor SN10 linearly changes its output value according to the oxygen concentration, and can estimate an air-fuel ratio of the mixture gas based on the output value of the linear $O_2$ sensor SN10.

The external EGR system 50 has the EGR passage 51 connecting the exhaust passage 40 to the intake passage 30, and an EGR cooler 52 and an EGR valve 53 provided in the EGR passage 51. The EGR passage 51 connects a portion of the exhaust passage 40 downstream of the catalytic converter 41 to a portion of the intake passage 30 between the throttle valve 32 and the booster 33. The EGR cooler 52 cools exhaust gas recirculated from the exhaust passage 40 to the intake passage 30 through the EGR passage 51 by heat exchange. The EGR valve 53 is provided in the EGR passage 51 downstream of the EGR cooler 52 (the side closer to the intake passage 30), and adjusts the flow rate of exhaust gas which flows through the EGR passage 51. Hereinafter, the exhaust gas recirculated from the exhaust passage 40 into the combustion chamber 6 (cylinder 2) through the EGR passage 51 is referred to as the external EGR gas.

The EGR passage 51 is provided with a differential pressure sensor SN9 which detects a difference between a pressure upstream of the EGR valve 53 and a pressure downstream of the EGR valve 53.

(2) Control System

Figure 4:
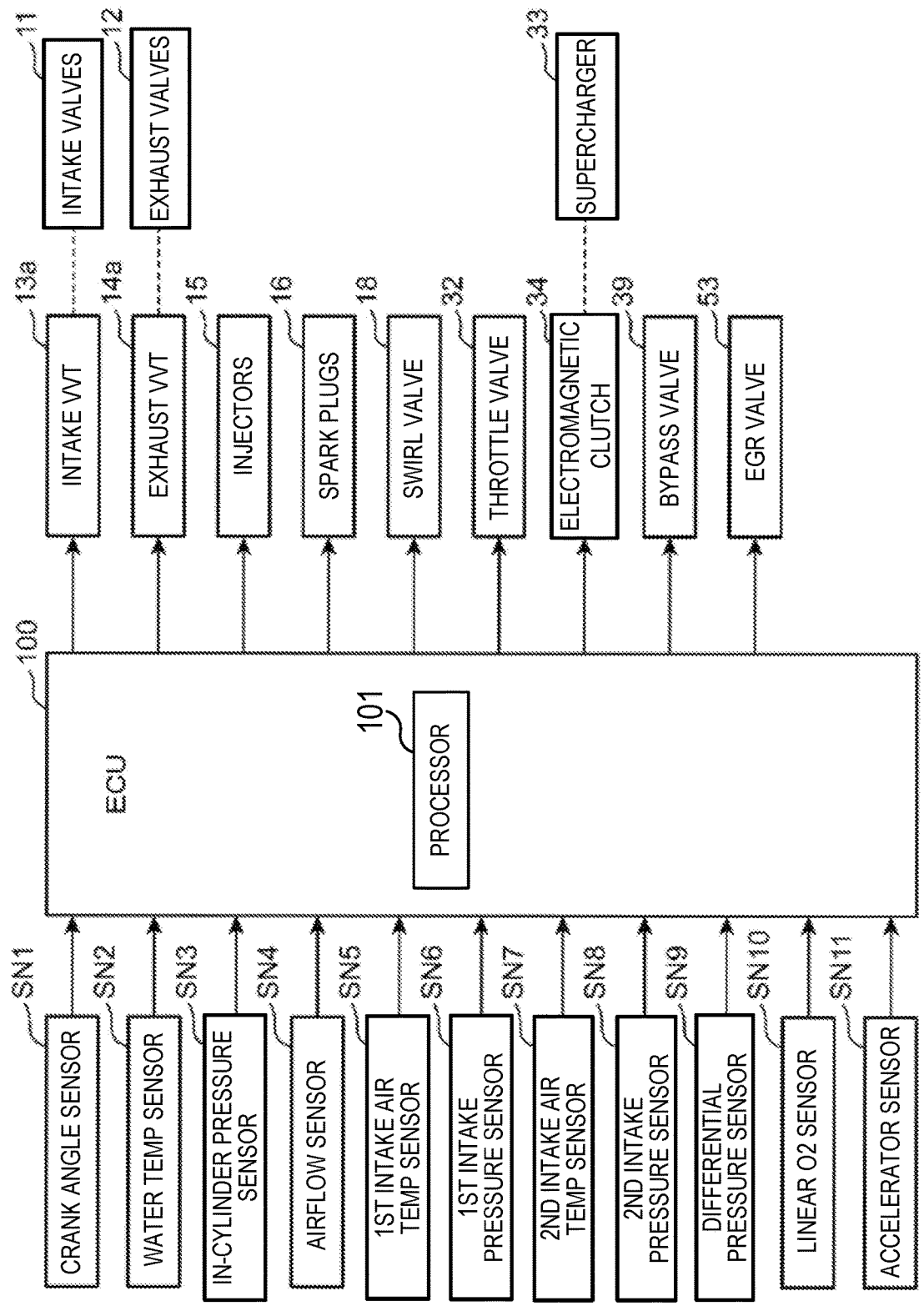
FIG. 4 is a block diagram illustrating an engine control system.

FIG. 4 is a block diagram illustrating an engine control system. An ECU (electronic control unit) 100 illustrated in FIG. 4 is a microprocessor which comprehensively controls the engine, and is comprised of a well-known processor 101 (e.g. a central processing unit (CPU)) having associated ROM and RAM.

The ECU 100 receives detection signals from various sensors. For example, the ECU 100 is electrically connected to the crank angle sensor SN1, the water temperature sensor SN2, the in-cylinder pressure sensor SN3, the airflow sensor SN4, and the first and second intake air temperature sensors SN5 and SN7, the first and second intake air pressure sensors SN6 and SN8, the differential pressure sensor SN9, and the linear $O_2$ sensor SN10 described above. The ECU 100 sequentially receives the information detected by these sensors (i.e., the crank angle, engine speed, engine water temperature, in-cylinder pressure, intake flow rate, intake air temperature, intake pressure, differential pressure before and after the EGR valve 53, oxygen concentration of exhaust gas, etc.).

Moreover, an accelerator sensor SN11 which detects an opening of an accelerator pedal operated by an operator who operates the vehicle is provided to the vehicle, and a detection signal from the accelerator sensor SN11 is also inputted into the ECU 100.

The ECU 100 controls the components of the engine, while performing various determinations and calculations based on the inputted signal from the respective sensors. That is, the ECU 100 is electrically connected to the intake VVT 13a, the exhaust VVT 14a, the injector 15, the spark plug 16, the swirl valve 18, the throttle valve 32, the electromagnetic clutch 34, the bypass valve 39, the EGR valve 53, etc., and outputs control signals to these components based on the calculation results. The ECU 100 is one example of a "controller."

(3) Control According to Operating State

Figure 5:
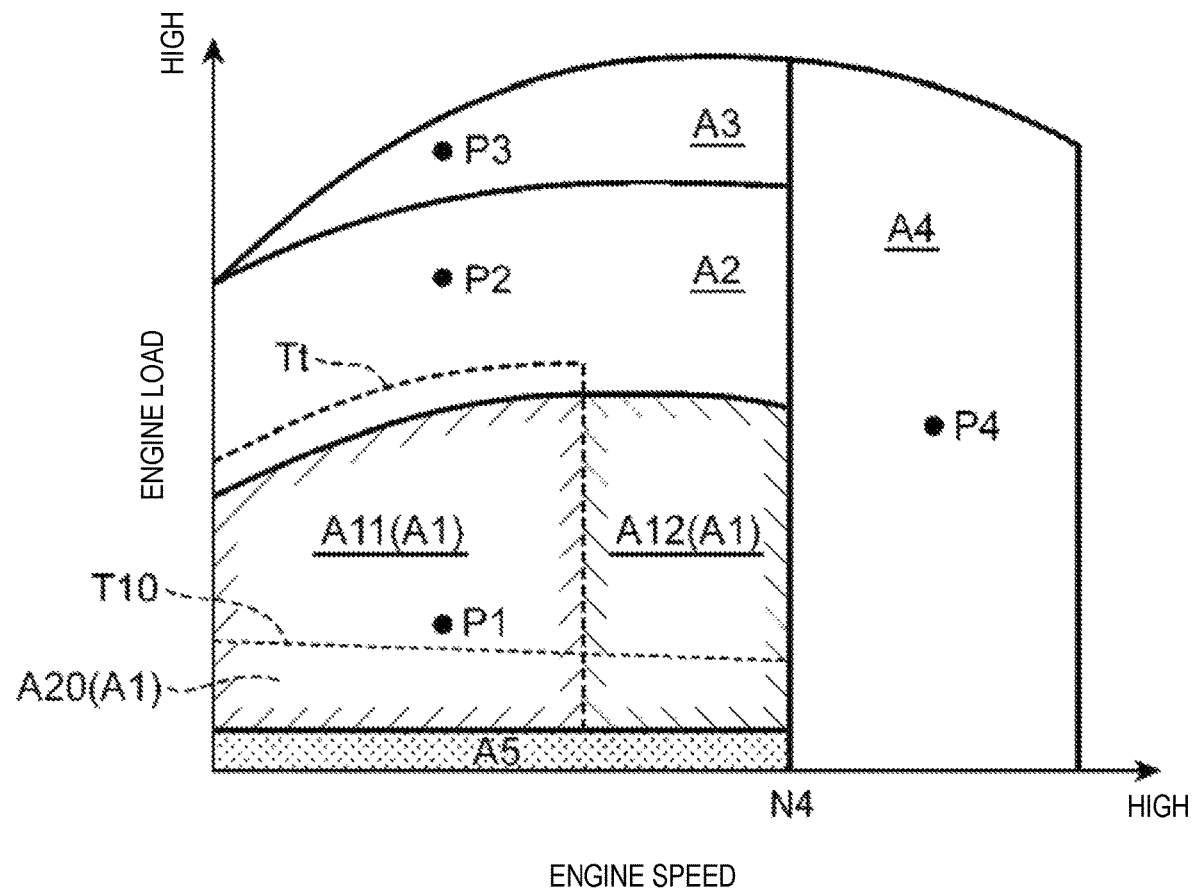
FIG. 5 is an operation map which classified an engine operating range by difference of a combustion mode.

FIG. 5 is an operation map used during an engine warm state in which a warm-up of the engine is completed, which illustrates a difference in control according to the engine speed and the load. Note that below, the phrase "the engine load is high (low)" as used herein is equivalent to "a required torque of the engine is high (low)."

As illustrated in FIG. 5, when the engine is in the warm state, the engine operating range can be roughly divided into five operating ranges A1-A5. Assuming a first divided range A1, a second divided range A2, a third divided range A3, a fourth divided range A4, and a reduced cylinder operating range A5, the fourth divided range A4 is a range where the engine speed is high, and the reduced cylinder operating range A5 is a range where the engine load is very low, the first divided range A1 is a range where a low-to-middle speed and low-load range which is obtained by subtracting the reduced cylinder operating range A5 and part of a high-load side from the range where the engine speed is lower than the fourth divided range A4, the third divided range A3 is a low-speed and high-load range where the engine speed is low and the load is high, and the second divided range A2 is the remaining range other than the reduced cylinder operating range A5, and the first, third, and fourth divided range A1, A3, and A4 (in other words, a combined range of a low-to-middle speed and middle-load range, and a middle-speed and high-load range). Below, the combustion mode selected for each operating range will be described in order.

Note that in the following description, although, as terms which specify the timing of fuel injection and spark ignition, terms such as "early stage," "middle stage," and "later stage" of a certain stroke, and terms such as "early half" and "latter half" of a certain stroke may be used, these terms are defined based on the following premises. That is, here, three periods formed by evenly dividing any stroke, such as an intake stroke or a compression stroke, are defined as "early stage," "middle stage," and "later stage" respectively. Thus, for example, (i) the early stage, (ii) the middle stage, and (iii) the later stage of a compression stroke refers to respective ranges of (i) 180 to 120° CA before a compression top dead center (BTDC), (ii) 120 to 60° CA BTDC, and (iii) 60 to 0° CA BTDC. Similarly, here, two periods formed by evenly dividing any stroke, such as an intake stroke or a compression stroke, are defined as "early half" and "latter half" respectively. Thus, for example, (iv) the early half and (v) the latter half of the intake stroke refers to respective ranges of (iv) 360 to 270° CA BTDC and (v) 270 to 180° CA BTDC.

(3-1) First Divided Range

In the first divided range Al with the low-to-middle speed and the low load, the SPCCI combustion which is a combination of the SI combustion and the CI combustion is performed. The SI combustion is a combustion mode in which the mixture gas is ignited by a spark generated from the spark plug 16, the mixture gas is forcibly combusted by flame propagation which expands the combustion range from the ignition point to the perimeter. The CI combustion is a combustion mode in which the mixture gas combusts by self-ignition under an environment where the temperature and pressure are increased by the compression of the piston 5. The SPCCI combustion which is a combination of the SI combustion and the CI combustion, is a combustion mode in which the SI combustion of a portion of mixture gas is carried out inside the combustion chamber 6 by spark ignition performed under an environment immediately before the mixture gas self-ignites, and the CI combustion of the remaining mixture gas is carried out inside the combustion chamber 6 by self-ignition after the SI combustion (a further increase in the temperature and pressure accompanying SI combustion). Note that "SPCCI" is an abbreviation of "SPark Controlled Compression Ignition," and the SPCCI combustion is one example of "partial compression-ignition combustion.".

Figure 7:
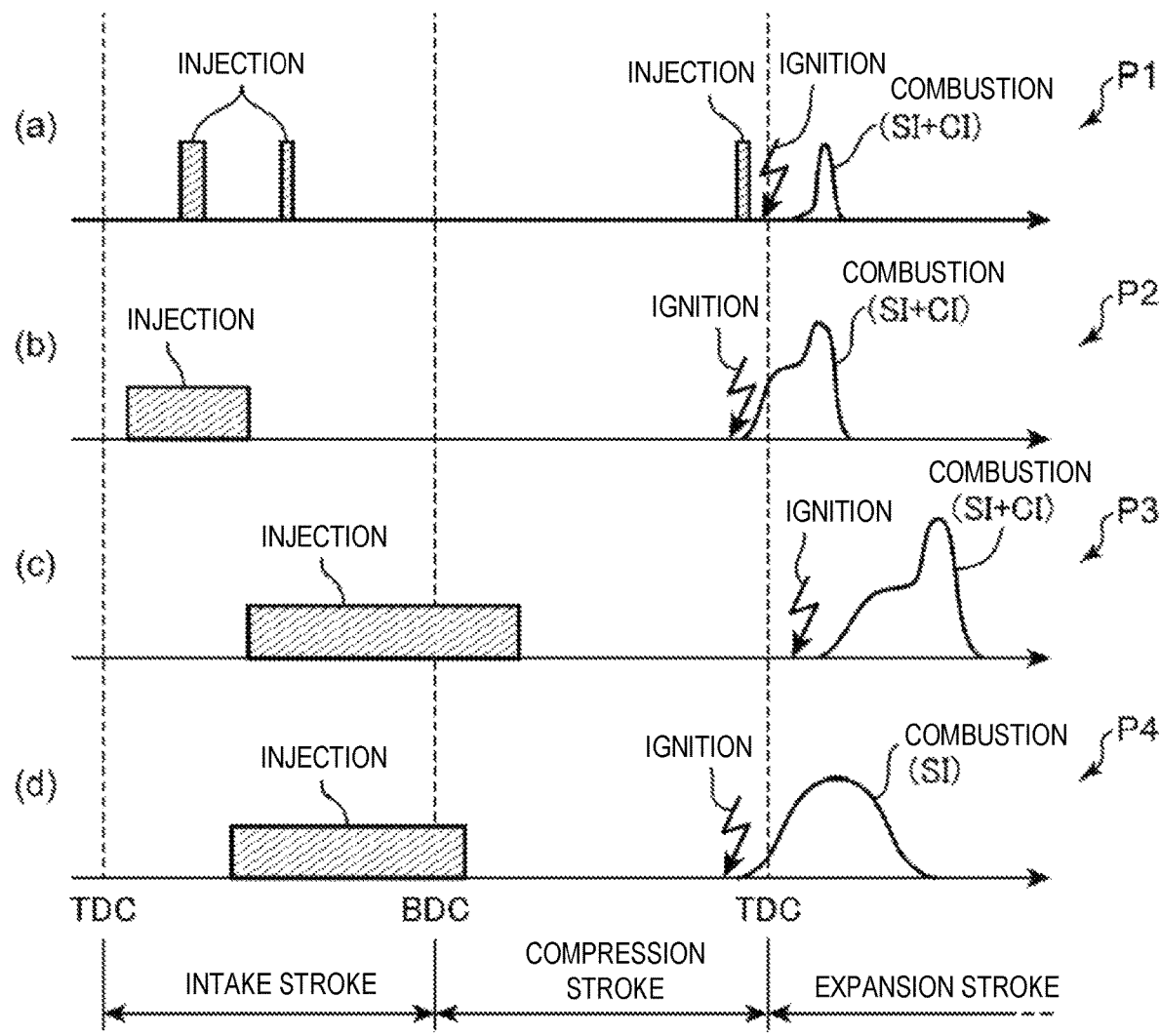
FIG. 7 is a time chart schematically illustrating a combustion control which is executed in each range.

The SPCCI combustion has a characteristic in which the heat generation in the CI combustion is faster than the heat generation in the SI combustion. For example, in a waveform of a heat generation rate by the SPCCI combustion, a rising slope in an early stage of the combustion corresponding to the SI combustion becomes shallower than a rising slope caused corresponding to the subsequent CI combustion, as will be described later with reference to FIG. 7. In other words, the waveform of the heat generation rate during the SPCCI combustion is formed so as to be continuous in the order of a first heat generation rate portion where the rising slope based on the SI combustion is relatively shallow, and a second heat generation rate portion where the rising slope based on the CI combustion is relatively steep. Moreover, corresponding to the tendency of such a heat generation rate, a pressure buildup rate (dp/dθ) inside the combustion chamber 6 caused during the SI combustion is lower than during the CI combustion, in the SPCCI combustion.

Figure 6:
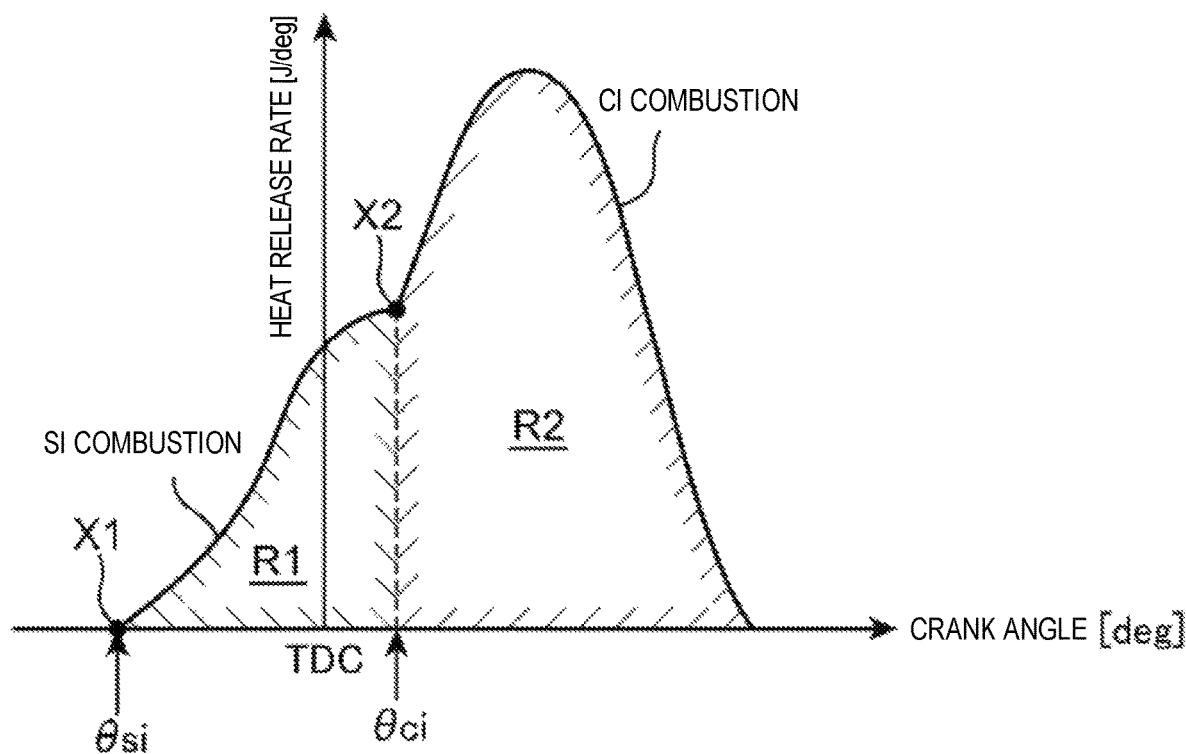
FIG. 6 is a graph illustrating a waveform of a heat generation rate during SPCCI combustion.

When the temperature and pressure inside the combustion chamber 6 are increased by SI combustion, unburnt mixture gas self-ignites in connection with this, and CI combustion is then started. As illustrated in FIG. 6, the slope of the waveform of the heat generation rate changes from shallow to steep at the timing of the self-ignition (i.e., a timing at which CI combustion starts). That is, the waveform of the heat generation rate in SPCCI combustion has a point of inflection (indicated by an "X2" in FIG. 6) which appears at the timing where CI combustion starts.

After the start of CI combustion, SI combustion and CI combustion are performed in parallel. Since the combustion velocity of the mixture gas in CI combustion is faster than that in SI combustion, the heat generation rate becomes relatively high. However, since CI combustion is performed after a compression top dead center, the slope of the waveform of the heat generation rate does not become excessive. That is, since the motoring pressure decreases due to the descent of the piston 5 after the compression top dead center, this reduces the increase in the heat generation rate, which avoids excessive dp/dθ during CI combustion. Thus, in SPCCI combustion, dp/dθ used as an index of combustion noise does not easily become excessive because of the characteristic in which CI combustion is performed after SI combustion, and combustion noise can be reduced compared to performing CI combustion alone (when carrying out CI combustion of all the fuel).

SPCCI combustion ends as CI combustion ends. Since the combustion velocity of CI combustion is faster than SI combustion, the combustion end timing is advanced compared to performing SI combustion alone (when carrying out SI combustion of all the fuel). In other words, in SPCCI combustion, the combustion end timing can be brought closer to the compression top dead center on the expansion stroke. Therefore, in SPCCI combustion, fuel efficiency can be improved compared to SI combustion alone.

In the first divided range Al, control is executed in which SPCCI combustion of the mixture gas is carried out, while making the air-fuel ratio (A/F) which is a weight ratio of air (fresh air: A) to fuel (F) inside the combustion chamber 6 higher than the stoichiometric air-fuel ratio (14.7:1), in order to reduce the amount of $NO_x$ generated by the combustion and to obtain a suitable fuel efficiency. That is, SPCCI combustion is performed, while an excess air factor λ in the combustion chamber 6 is set to λ>1. The air-fuel ratio (A/F) in the first divided range A1 is set to 20 or higher so that the amount of $NO_x$ generated by the combustion becomes sufficiently small. For example, the air-fuel ratio (A/F) in the first divided range A1 is variably set within a range more than 20 and less than 35. A target air-fuel ratio in the first divided range A1 is substantially set to increase as the load (required torque) becomes higher.

In order to realize SPCCI combustion in such an environment in which the air-fuel ratio is set higher than the stoichiometric air-fuel ratio (hereinafter, may suitably be referred to as "the A/F lean environment"), each component of the engine is controlled by the ECU 100 as follows in the first divided range A1.

The injector 15 dividedly injects fuel a plurality of times from the intake stroke to the compression stroke. For example, at an operation point P1 where the engine speed is relatively low and the load is relatively low in the first divided range A1, the injector 15 injects a majority of the fuel for one cycle in two portions from the early stage to the middle stage of the intake stroke, and injects the remaining fuel in a final stage of the compression stroke (a total of three injections), as illustrated in the chart (a) of FIG. 7.

The spark plug 16 ignites the mixture gas near a compression top dead center (TDC). For example, at the operation point P1, the spark plug 16 ignites the mixture gas at a slightly advanced timing than TDC of compression stroke. This ignition triggers SPCCI combustion, a portion of the mixture gas in the combustion chamber 6 combusts by flame propagation (SI combustion), and the remaining mixture gas then combusts by self-ignition (CI combustion).

The booster 33 is in an OFF state within a range of the boosting line Tt illustrated in FIG. 5, and in an ON state outside the range of the boosting line Tt. Inside the range of the boosting line Tt where the booster 33 is in the OFF state, i.e., in a low-speed range of the first divided range A1, the electromagnetic clutch 34 is disengaged to release the connection of the booster 33 with the engine body 1, and the bypass valve 39 is fully opened to suspend the boost by the booster 33. On the other hand, a range outside the boosting line Tt where the booster 33 is in the ON state, i.e., in a high-speed range of the first divided range A1, the boost is performed by the booster 33 by engaging the electromagnetic clutch 34 to connect the booster 33 to the engine body 1. Here, the opening of the bypass valve 39 is controlled so that the pressure inside the surge tank 36 (boosting pressure) detected by the second intake pressure sensor SN8 is in agreement with a preset target pressure for every operating condition of the engine (such as the engine speed and the load). For example, as the opening of the bypass valve 39 increases, a flow rate of intake air which flows backward to an upstream side of the booster 33 through the bypass passage 38 increases, and as a result, the pressure of intake air introduced into the surge tank 36, i.e., the boosting pressure decreases. Thus, the bypass valve 39 adjusts the boosting pressure to the target pressure by adjusting an amount of the backward flow of intake air.

In the first divided range A1, in order to introduce a large amount of air into the combustion chamber 6 to increase the air-fuel ratio inside the combustion chamber 6 as described above, the throttle valve 32 is fully opened or nearly fully opened.

The intake VVT 13a and the exhaust VVT 14a are driven so that the open timing and the close timing of the intake valve 11 and the open timing and the close timing of the exhaust valve 12 become timings at which the amount of air inside the combustion chamber 6 becomes an appropriate amount, and a stable SPCCI combustion is realized. The detail will be described later.

The opening of the EGR valve 53 is adjusted so that the in-cylinder temperature suitable for acquiring the waveform of desired SPCCI combustion (a target SI ratio and a target θci which will be described later) is realized, in other words, the external EGR gas is introduced into the combustion chamber 6 by an amount required to reach the temperature. The detail will be described later.

The opening of the swirl valve 18 is adjusted so that a relatively strong swirl flow is formed inside the combustion chamber 6. The detail will be described later.

In the first divided range A1, a reduced-cylinder operation switching range A20 is set as a range where the engine load is lower than a preset reduced-cylinder operation switching load T10. In the reduced-cylinder operation switching range A20, a reduced-cylinder operation executing condition described later is satisfied, not all-cylinder operation is performed in which all the cylinders are operated, but a reduced-cylinder operation is performed in which only some of the cylinders are operated and the rest of the cylinders are stopped. The reduced-cylinder operation switching range A20 is an example of a "reduced cylinder range."

In this embodiment, two of the four cylinders are stopped and two cylinders are operated in the reduced-cylinder operation. For example, the injectors 15 of the non-operating cylinders (hereinafter, may suitably be referred to as "the paused cylinders") are stopped to suspend the supply of the fuel into the paused cylinders, and only the injectors 15 of the operating cylinders are maintained to supply the fuel to only the operating cylinders.

The amount of the fuel supplied to each operating cylinder is set greater than the amount of the fuel supplied to each cylinder when carrying out the all-cylinder operation. On the other hand, the control described above is executed also in the reduced-cylinder operation, except for the amount of the fuel supplied to each cylinder, and specific open timings and close timings of the intake valves 11 and the exhaust valves 12 which will be described later. That is, each control of the injectors 15, the spark plugs 16, the throttle valves 32, the superchargers 33, the EGR valves 53, and the swirl valves 18 is carried out in the first divided range A1 regardless of all-cylinder operation or the reduced-cylinder operation. For example, in the first divided range A1, also during the reduced-cylinder operation, the air-fuel ratio in the operating cylinders is set higher than the stoichiometric air-fuel ratio ($\lambda>1$), and the injectors 15 and the spark plugs 16 are controlled as illustrated in the chart (a) of FIG. 7, similar to the all-cylinder operation, to execute SPCCI combustion.

Here, since it is necessary to make the air-fuel ratio of exhaust gas near the stoichiometric air-fuel ratio when $NO_x$ is purified by the three-way catalyst, it is necessary to suspend the intake valves 11 and the exhaust valves 12 of the paused cylinders in order to avoid the air flowing into the exhaust passage 40 and the air-fuel ratio of the exhaust gas becoming lean. On the other hand, in this embodiment, since the amount of $NO_x$ which is generated in the combustion chambers 6 where the air-fuel ratio of the operating cylinders is lean as described above is kept small, the necessity that the three-way catalyst purifies $NO_x$ is small. Thus, in this embodiment, during the reduced-cylinder operation, the intake valves 11 and the exhaust valves 12 of the paused cylinders are kept driven like during the all-cylinder operation. Thereby, it is not necessary to provide a mechanism for stopping the operation of the intake valves 11 and the exhaust valves 12 of the paused cylinders, and the structure of the control system can be simplified. The details of the reduced-cylinder operation executing condition, etc. will be described later.

(3-2) Reduced Cylinder Operating Range

In the reduced cylinder operating range A5, the reduced-cylinder operation is always carried out, regardless of the operating condition. Note that also in the reduced cylinder operating range A5, each control of the injector 15, the spark plug 16, the throttle valve 32, the booster 33, the EGR valve 53, and the swirl valve 18 is carried out, similar to the first divided range A1. For example, also in the reduced cylinder operating range A5, the air-fuel ratio of each cylinder is set higher than the stoichiometric air-fuel ratio, the injectors 15 and the spark plugs 16 are controlled as illustrated in the chart (a) of FIG. 7 to perform SPCCI combustion.

(3-3) Second Divided Range

In the second divided range A2, a control to carry out SPCCI combustion of the mixture gas is executed, while forming an environment in which a gas-fuel ratio (G/F) which is a weight ratio of all the gas to fuel inside the combustion chamber 6 is higher than the stoichiometric air-fuel ratio (14.7:1) and the air-fuel ratio (A/F) substantially equals to the stoichiometric air-fuel ratio (hereinafter, this is referred to as G/F-lean environment). For example, in order to realize SPCCI combustion under such a G/F-lean environment, in the second divided range A2, each component of the engine is controlled by the ECU 100 as follows.

The injector 15 performs at least one fuel injection during the intake stroke. For example, at an operation point P2 included in the second divided range A2, the injector 15 performs one fuel injection which supplies the entire amount of fuel to be injected in one cycle during the intake stroke, as illustrated in a chart (b) of FIG. 7.

The spark plug 16 ignites the mixture gas near a compression top dead center (TDC). For example, at the operation point P2, the spark plug 16 ignites the mixture gas at a slightly advanced timing than TDC of compression stroke. Then, this ignition triggers SPCCI combustion, a portion of the mixture gas in the combustion chamber 6 combusts by flame propagation (SI combustion), and the remaining mixture gas then combusts by self-ignition (CI combustion).

The opening of the throttle valve 32 is set to a valve opening so that an amount of air corresponding to the stoichiometric air-fuel ratio is introduced into the combustion chamber 6 through the intake passage 30, i.e., so that the air-fuel ratio (A/F) which is a weight ratio of air inside the combustion chamber 6 (fresh air: A) to fuel (F) substantially equals to the stoichiometric air-fuel ratio (14.7:1). On the other hand, in the second divided range A2, the EGR valve 53 is opened and external EGR gas is introduced into the combustion chamber 6. Thus, in the second divided range A2, the gas air-fuel ratio (G/F) which is a weight ratio of all the gas in the combustion chamber 6 to fuel becomes higher than the stoichiometric air-fuel ratio (14.7:1).

The booster 33 is in the OFF state in the low-load and low-speed part which overlaps with the range inside the boosting line Tt, and is in the ON state in other ranges. When the booster 33 is in the ON state and intake air is boosted, the opening of the bypass valve 39 is controlled so that the pressure inside the surge tank 36 (boosting pressure) is in agreement with the target pressure.

The EGR valve 53 adjusts the amount of the external EGR gas for SPCCI combustion in the second divided range A2 introduced into the combustion chamber 6. The intake VVT 13a and the exhaust VVT 14a set the valve timings of the intake valves 11 and the exhaust valves 12 so that a given length of the valve overlap period is formed. The opening of the swirl valve 18 is set to about the same opening in the first divided range A1, or set to a given middle opening larger than this.

(3-4) Third Divided Range

In the third divided range A3, control in which SPCCI combustion of the mixture gas is carried out under an environment where the air-fuel ratio in the combustion chamber 6 is slightly richer than the stoichiometric air-fuel ratio ($\lambda$<1) is performed. For example, in order to realize SPCCI combustion under such a rich environment, each component of the engine is controlled by the ECU 100 in the third divided range A3 as follows.

The injector 15 injects all or a majority of the fuel to be injected in one cycle during the intake stroke. For example, at an operation point P3 included in the third divided range A3, the injector 15 injects fuel over a continuous period which overlaps with the latter half of the intake stroke, as illustrated in a chart (c) of FIG. 7, and in more detailed, a continuous period from the latter half of the intake stroke to the early half of the compression stroke.

The spark plug 16 ignites the mixture gas near a compression top dead center. For example, at the operation point P3, the spark plug 16 ignites the mixture gas at a slightly retarded timing than TDC of compression stroke.

The booster 33 is in the ON state, and the boost is performed by the booster 33. The boosting pressure at this time is adjusted by the bypass valve 39. The intake VVT 13a and the exhaust VVT 14a set the timings of the intake valve 11 and the exhaust valve 12 so that the internal EGR is substantially stopped. The throttle valve 32 is fully opened. The opening of the EGR valve 53 is controlled so that the air-fuel ratio (A/F) in the combustion chamber 6 becomes slightly richer than the stoichiometric air-fuel ratio ($\lambda$<1). For example, the EGR valve 53 adjusts an amount of exhaust gas which recirculates through the EGR passage 51 (external EGR gas) so that the air-fuel ratio may become 12 or higher and 14 or lower. Note that the EGR valve 53 may be closed near the maximum load of the engine to substantially stop the external EGR.

The opening of the swirl valve 18 is set as a middle opening which is larger than the valve opening in the first and second ranges A1 and A2 and smaller than the opening equivalent to the fully-open state.

(3-5) Fourth Divided Range

In the fourth divided range A4, a traditional SI combustion is performed. In order to realize SI combustion, each component of the engine is controlled by the ECU 100 in the fourth divided range A4 as follows.

The injector 15 injects fuel over a given period which overlaps at least with the intake stroke. For example, at an operation point P4 included in the fourth divided range A4, the injector 15 injects fuel over a continuous period from the intake stroke to the compression stroke, as illustrated in a chart (d) of FIG. 7.

The spark plug 16 performs the spark ignition within a period from the latter half of the compression stroke to the early half of the expansion stroke. For example, at the operation point P4, the spark plug 16 performs the spark ignition in the latter half of the compression stroke, as illustrated in the chart (d) of FIG. 7. Then, this ignition triggers SI combustion and all of the mixture gas in the combustion chamber 6 combusts by flame propagation.

The booster 33 is in the ON state, and the boost is performed by the booster 33. The boosting pressure at this time is adjusted by the bypass valve 39. Respective openings of the throttle valve 32 and the EGR valve 53 are controlled so that the air-fuel ratio (A/F) in the combustion chamber 6 becomes the stoichiometric air-fuel ratio or slightly richer than the stoichiometric air-fuel ratio ($\lambda$<1). The swirl valve 18 is fully opened.

(4) Setting of Open Timings and Close Timings of Intake Valve and Exhaust Valve in First Operating Range Next, the details of timings of opening and closing the intake valve 11 and the exhaust valve 12 which are performed in the first divided range A1 (an execution range of SPCCI combustion under the A/F lean environment) of FIG. 5 described above.

(4-1) Natural Aspiration A/F Lean Range (All-Cylinder Operation)

First, the open timings and the close timings of the intake valve 11 and the exhaust valve 12 during the all-cylinder operation are described, and below, the timings are described on the assumption that the engine is during the all-cylinder operation.

(Open and Close Timings of Intake Valve)

Figure 8:
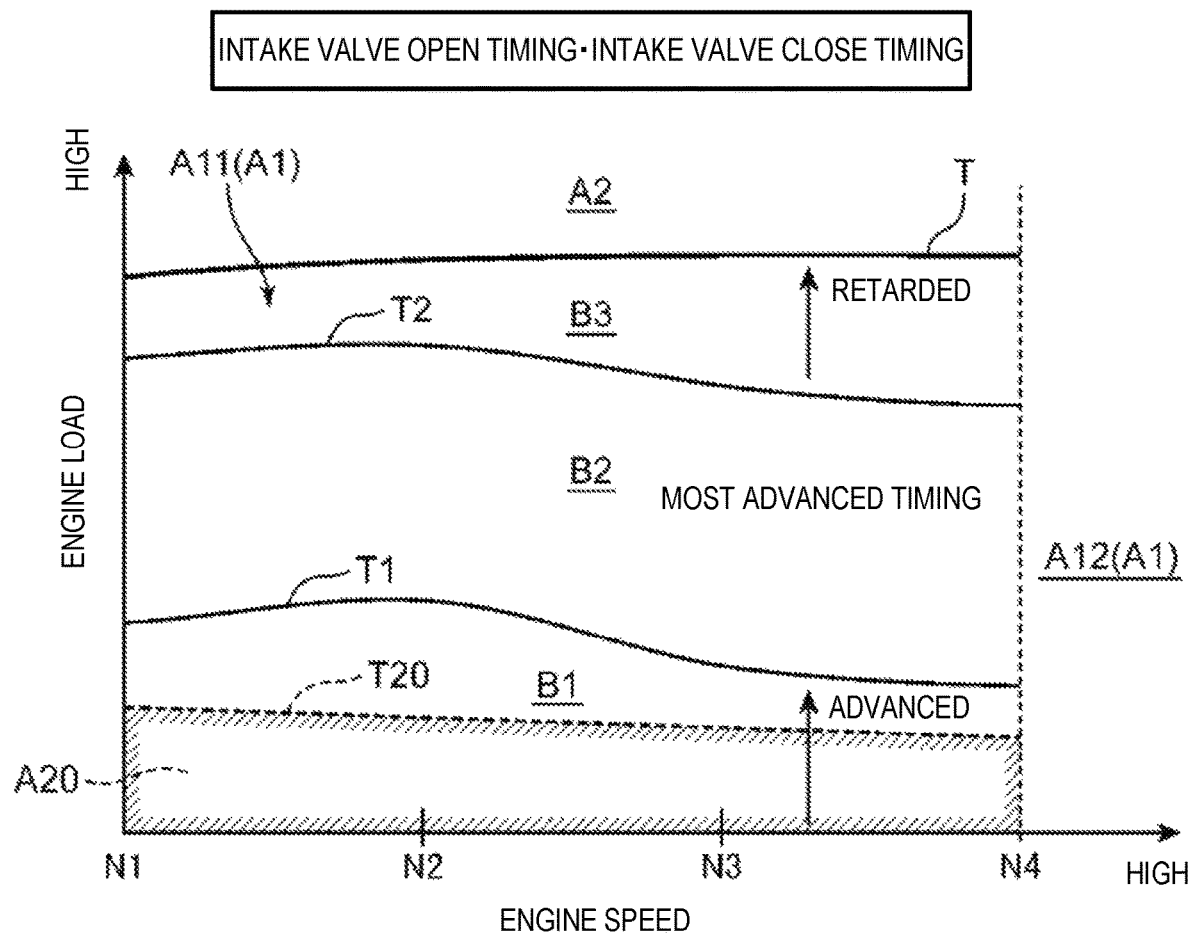
FIG. 8 is an operation map which classified a natural-aspiration A/F lean range by a difference between an open timing and a close timing of an intake valve.

FIG. 8 is an operation map in which a range in the range All inside a line T of the first divided range A1, where the boost is not performed by the booster 33 (hereinafter, may suitably be referred to as "the natural-aspiration A/F lean range) is classified by a difference in the open timing and the close timing of the intake valve 11.

As illustrated in FIG. 8, the natural-aspiration A/F lean range All is roughly divided into three ranges B1-B3 by the difference in the open timing and the close timing of the intake valve 11. Assuming a first lean range B1, a second lean range B2, and a third lean range B3, the first lean range B1 is a low-load range where the engine load is lower than a preset first load T1, the third lean range B3 is a high-load range where the engine load is higher than a preset second load T2, and the second lean range B2 is the remaining middle-load range.

As illustrated in FIG. 8, both the first load T1 and the second load T2 are set substantially smaller as the engine load increases.

The first lean range B1 is an example of a "first operating range," the second lean range B2 is an example of a "second operating range," and the first load T1 is an example of a "first reference load." Note that as described later, the first load T1 is an engine load at a boundary of a load range where the open timing IVO of the intake valve 11 is advanced with an increase in the engine load, and a load range where the timing is maintained at the most advanced timing.

Figure 9:
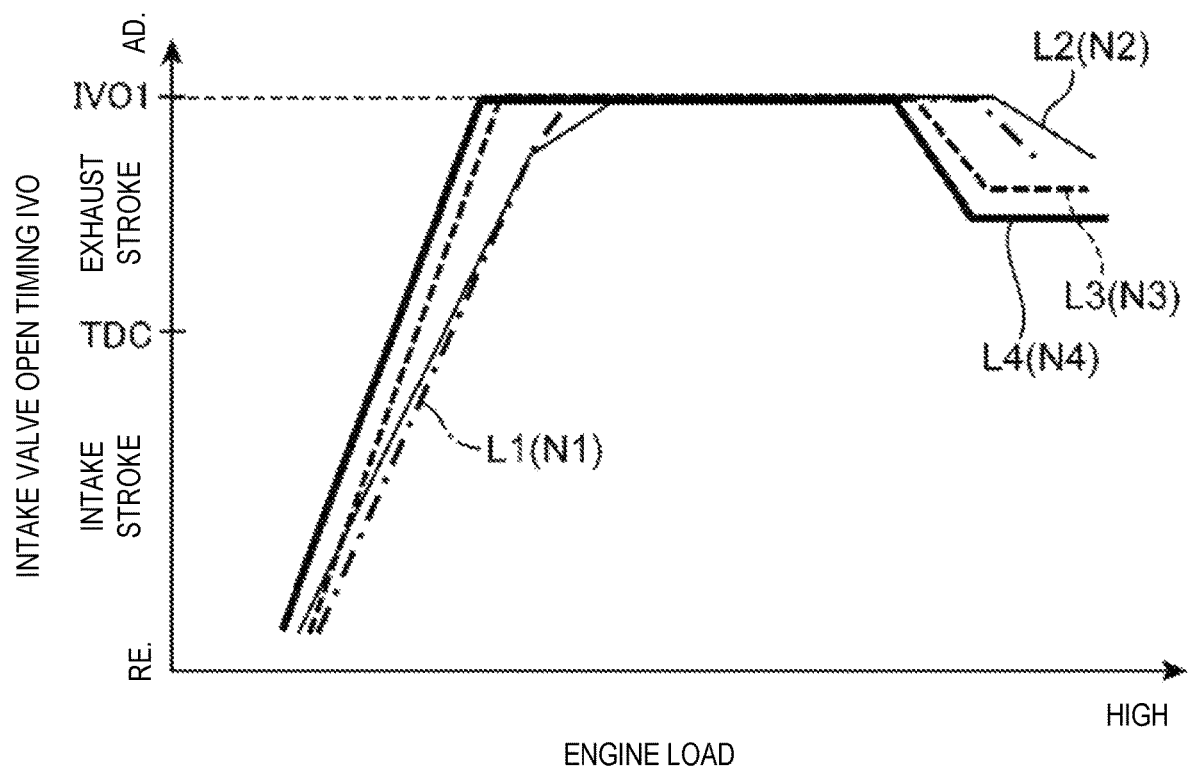
FIG. 9 is a graph illustrating one example of the open timing of the intake valve set in the natural-aspiration A/F lean range.
Figure 10A:
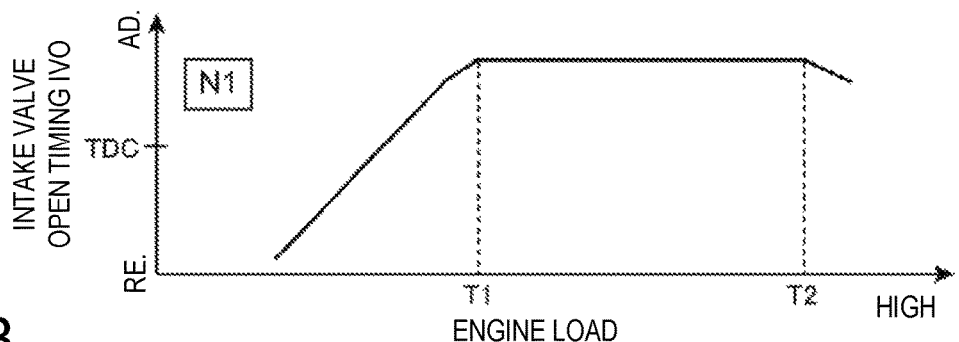
FIGS. 10A to 10D are graphs illustrating a relationship between an engine load and the open timing of the intake valve which are set for each engine speed in the natural-aspiration A/F lean range, where
Figure 10B:
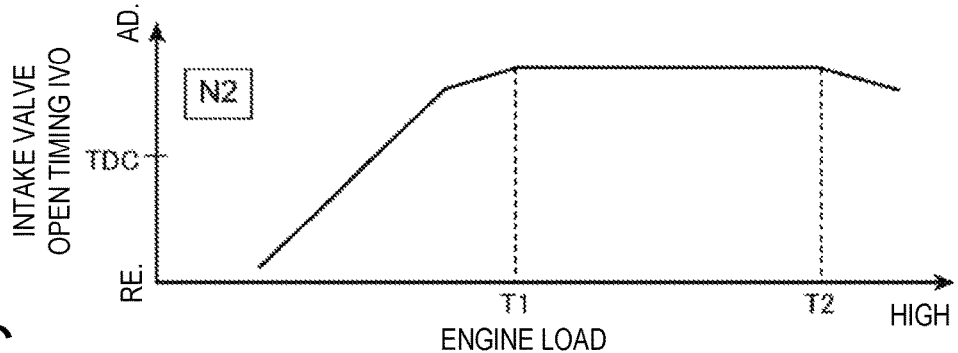
Figure 10C:
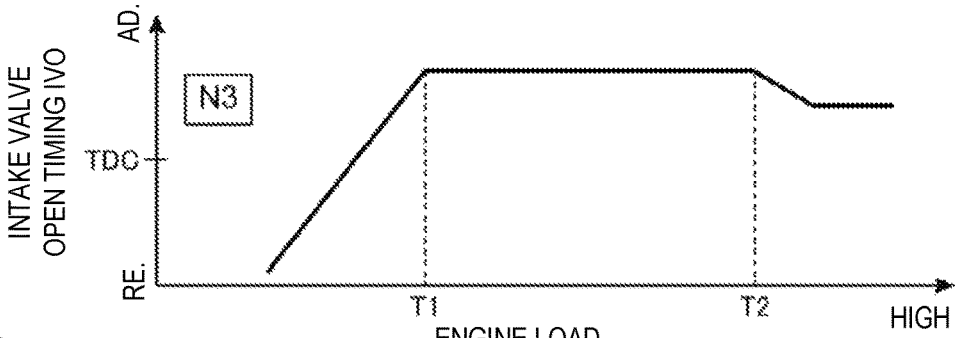
Figure 10D:
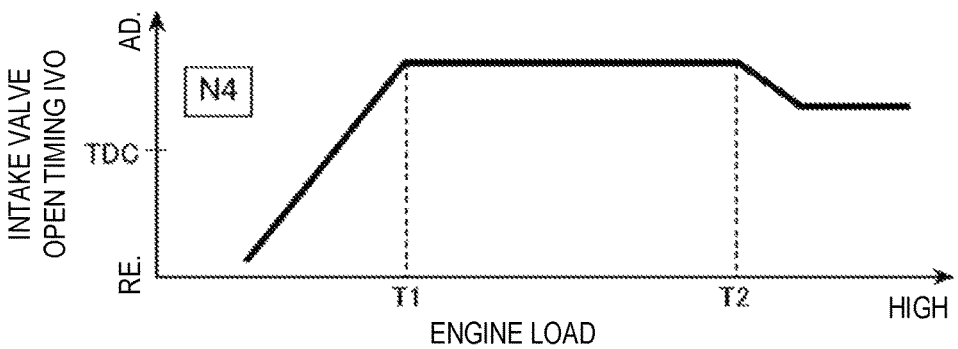

FIG. 9 is a graph illustrating one example of the open timing IVO of the intake valve 11 in the natural-aspiration A/F lean range All (during the all-cylinder operation). In FIG. 9, the horizontal axis indicates the engine load and the vertical axis indicates the open timing IVO of the intake valve 11. Lines L1, L2, L3, and L4 illustrate the open timing IVO of the intake valve 11 when the engine speed is a first speed N1, a second speed N2, a third speed N3, and a fourth speed N4, respectively. FIGS. 10A to 10D illustrate the respective lines L1-L4. The first to fourth speeds N1, N2, N3, and N4 correspond to N1, N2, N3, and N4 illustrated in FIG. 8, and the engine speed is higher in this order (N1<N2<N3<N4).

As illustrated for example in FIGS. 10A to 10D, in the first lean range B1 of the natural-aspiration A/F lean ranges A11, where the engine load is lower than the first load T1, the open timing IVO of the intake valve 11 is retarded as the engine load decreases. In this embodiment, the open timing IVO of the intake valve 11 and the engine load have a substantially linear relationship, and the open timing IVO of the intake valve 11 is retarded as the engine load decreases.

Throughout the first lean range B1 (at all the engine speeds N1-N4), the open timing IVO of the intake valve 11 becomes a most advanced timing IVO1 when the engine load is the first load T1, and the open timing IVO of the intake valve 11 is retarded with a reduction in the engine load from the most advanced timing IVO1 to a timing on the retarded side of an exhaust top dead center. Thus, in the first lean range B1, the open timing IVO of the intake valve 11 is set so as to change greatly from the minimum load to the maximum load, where a rate of change in the open timing IVO of the intake valve 11 to the engine load is large.

On the other hand, in the second lean range B2 in the natural-aspiration A/F lean range A11 where the engine load is higher than the first load T1 and lower than the second load T2, the open timing IVO of the intake valve 11 is the most advanced timing IVO1, i.e., a timing at the most advanced side within a range of the open timing IVO of the intake valve 11. That is, in the second lean range B2, the open timing IVO of the intake valve 11 is maintained at the most advanced timing, and a rate of change to the engine load is set to 0, regardless of the engine load and the engine speed.

In the third lean range B3 in the natural-aspiration A/F lean range A11 where the engine load is higher than the second load T2, the open timing IVO of the intake valve 11 is set at a more retarded timing as the engine load increases. Note that a retarded amount of the open timing IVO of the intake valve 11 in the entire third lean range B3 (a difference between the open timing of the intake valve in the minimum load and the open timing of the intake valve in the maximum load of the third lean range B3) is small, and the open timing IVO of the intake valve 11 in the third lean range B3 is set near the most advanced timing. Moreover, an absolute value of the rate of change in the open timing IVO of the intake valve 11 to the engine load in the third lean range B3 is also relatively small, and it is smaller than an absolute value of the rate of change in the first lean range B1.

Thus, in this embodiment, the open timing IVO of the intake valve 11 is retarded as the engine load decreases in the first lean range B1 of the natural-aspiration A/F lean range A11, where the engine load is low. On the other hand, in the second lean range B2, the open timing IVO of the intake valve 11 is maintained at the most advanced timing IVO1, and the open timing IVO of the intake valve 11 is set near the most advanced timing in the third lean range B3.

Figure 11:
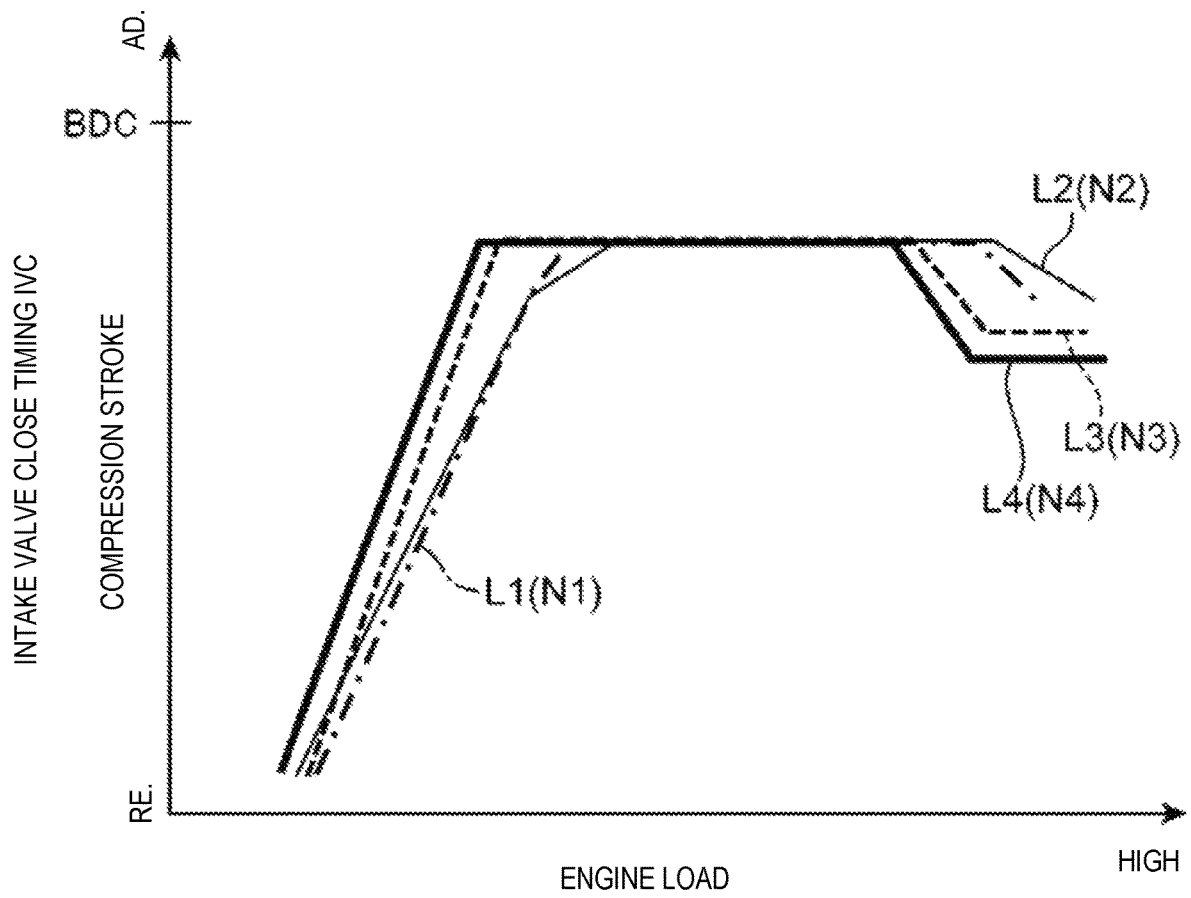
FIG. 11 is a graph illustrating one example of the close timing of the intake valve set in the natural-aspiration A/F lean range.

FIG. 11 is a graph illustrating one example of the close timing IVC of the intake valve 11 when the all-cylinder operation is carried out in the natural-aspiration A/F lean range A11, and is a graph corresponding to FIG. 9.

As described above, the intake valve 11 is changed in the open timing and the close timing while the valve opening periods are fixed. Therefore, the close timing IVC of the intake valve 11 changes similar to the open timing IVO of the intake valve 11 according to the engine load and the engine speed. That is, when the engine load is the first load T1, the close timing IVC of the intake valve 11 is set at the most advanced side (hereinafter, this most advanced timing of the valve close timing of the intake valve 11 is suitably referred to as "the most advanced valve close timing"). In the first lean range B1 where the engine load decreased more than the first load T1, the close timing IVC of the intake valve 11 is retarded from the most advanced valve close timing as the engine load decreases. On the other hand, in the second lean range B2, the close timing IVC of the intake valve 11 is maintained at the most advanced valve close timing, and is also set near the most advanced valve close timing in the third lean range B3. Moreover, the absolute value of the rate of change in the close timing IVC of the intake valve 11 to the engine load in the first lean range B1 is set greater than the absolute value of the rate of change in other ranges B2 and B3.

As illustrated in FIG. 11, in the natural-aspiration A/F lean range A11, the close timing IVC of the intake valve 11 is set to a more retarded side of the intake BDC, regardless of the engine load and the engine speed. Therefore, when the close timing IVC of the intake valve 11 is retarded with the reduction in the engine load in the first lean range B1, the amount of air which flows into the combustion chamber 6 decreases. That is, when the close timing IVC of the intake valve 11 is retarded from the intake BDC, air inside the combustion chamber 6 is drawn out to the intake port 9 side with the ascent of the piston 5. Therefore, as the close timing IVC of the intake valve 11 is retarded within a range on the retarded side of the intake BDC, the amount of air drawn out to the intake port 9 increases, and the amount of air which exists in the combustion chamber 6 decreases when the intake valve 11 is closed. Particularly in this embodiment, the most advanced valve close timing which is possibly the most advanced timing of the close timing of the intake valve 11 is set near a timing at which the amount of air which can be introduced into the combustion chamber 6 becomes the maximum. Therefore, the amount of air inside the combustion chamber 6 is reduced as the close timing IVC of the intake valve 11 is more retarded from the most advanced valve close timing in the first lean range B1.

(Open and Close Timings of Exhaust Valve)

Figure 12:
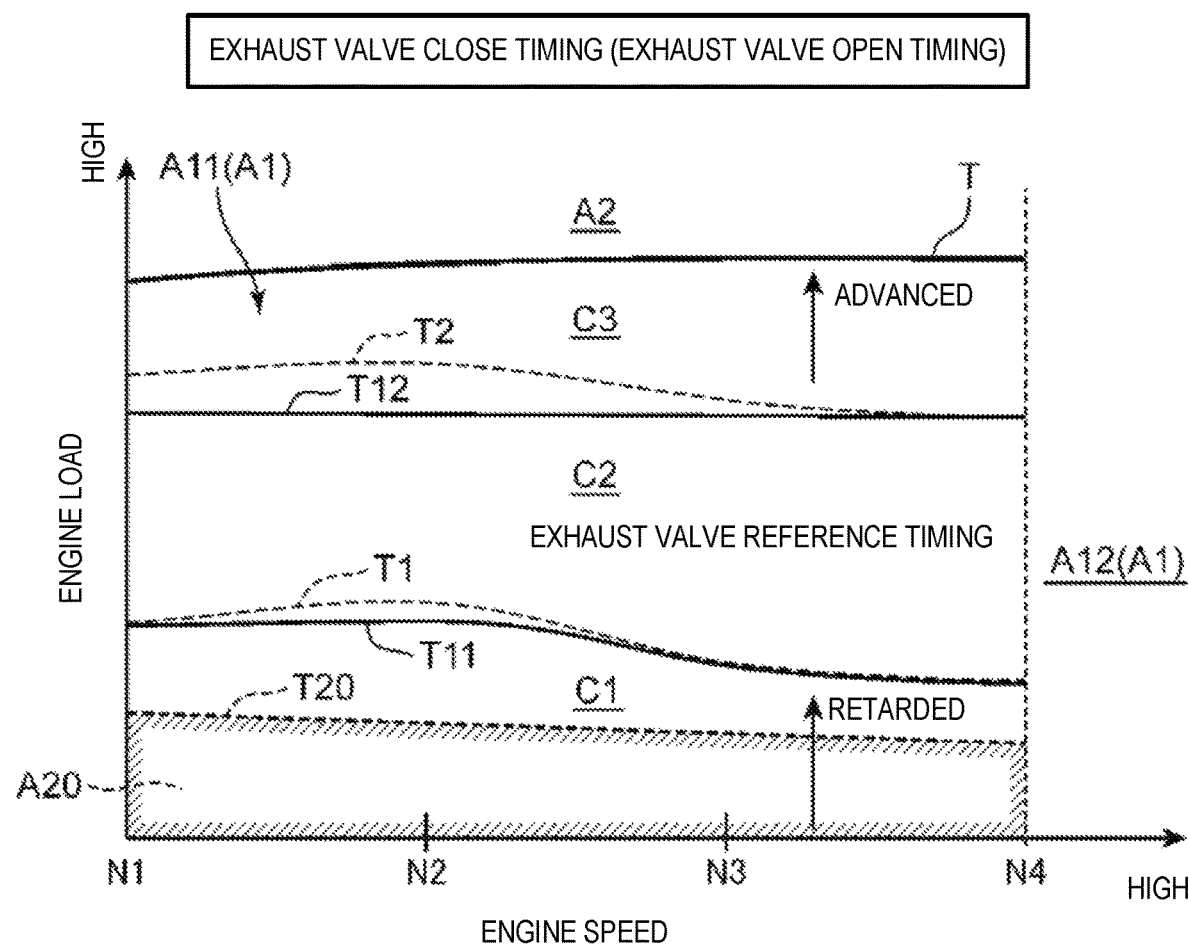
FIG. 12 is an operation map which classified the natural-aspiration A/F lean range by a difference between open and close timings of an exhaust valve.
Figure 13:
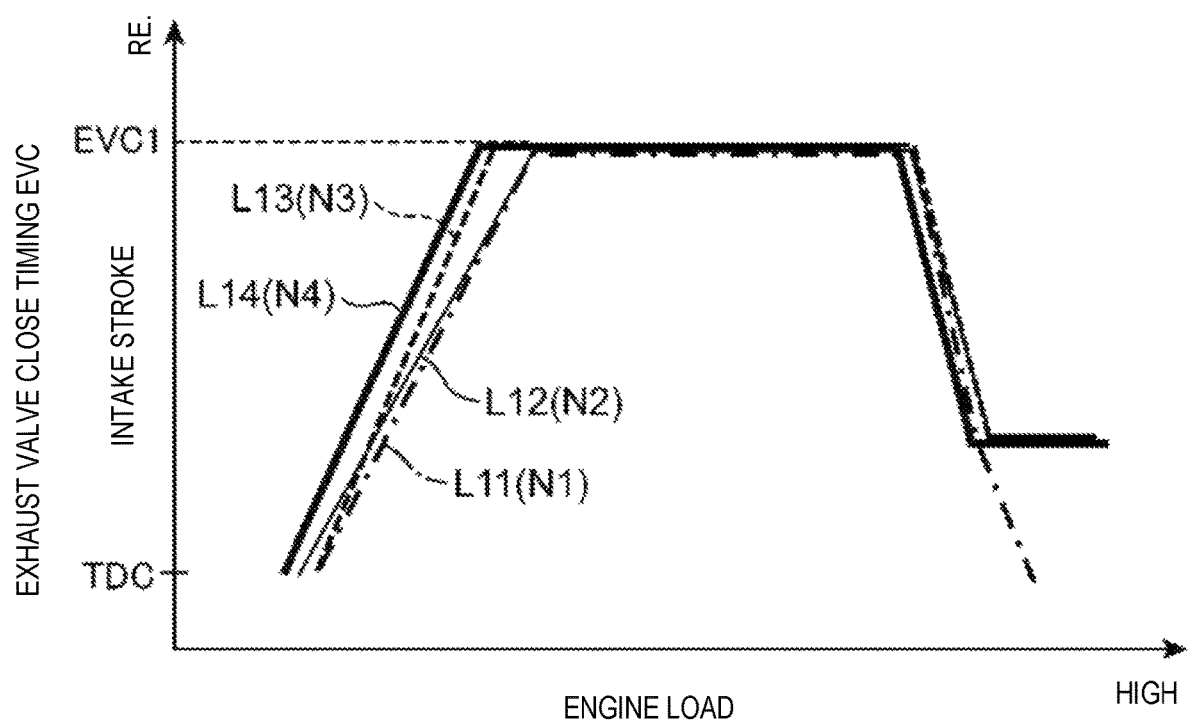
FIG. 13 is a graph illustrating one example of the close timing of the exhaust valve set in the natural-aspiration A/F lean range.

FIG. 12 is an operation map illustrating the natural-aspiration A/F lean range A11 classified by a difference in the open timing and the close timing of the exhaust valve 12. FIG. 13 is a graph illustrating one example of the close timing EVC of the exhaust valve 12 when the all-cylinder operation is carried out in the natural-aspiration A/F lean range, and is a graph corresponding to FIG. 9. Lines L11-L13 in FIG. 13 are curves indicating a relationship between the engine load and the close timing EVC of the exhaust valve 12 at the respective engine speeds N1-N4.

As illustrated in FIG. 12, the natural-aspiration A/F lean range All is roughly divided into three ranges C1-C3 by the difference in the open timing and the close timing of the exhaust valve 12. Assuming a fourth lean range C1, a fifth lean range C2, and a sixth lean range C3, the fourth lean range C1 is a low load range where the engine load is lower than a preset third load T11, the sixth lean range C3 is a high load range where the engine load is higher than a preset fourth load T12, and the remaining fifth lean range C2 is a middle load range.

The fourth lean range C1 is an example of a "third operating range," the fifth lean range C2 is an example of a "fourth operating range," the sixth lean range C3 is an example a "fifth operating range," and the third load T11 corresponds to a "second reference load." Note that as described later, the third load T11 is an engine load at a boundary of a load range where the close timing EVC of the exhaust valve 12 is retarded with an increase in the engine load, and a load range where the valve close timing EVC is fixed.

In this embodiment, the first load T1 and the third load T11 are set to substantially the same value for each engine speed, and the first lean range B1 and the fourth lean range C1 are set as almost the same range. For example, as illustrated in FIG. 12, the first load T1 when the engine speed is N2 is set as a slightly larger value than the third load T11 when the engine speed is N2. Note that the difference is small enough to the full load of the engine (maximum load).

Unlike the second load T2, the fourth load T12 is set as a substantially constant value, regardless of the engine speed. In this embodiment, the fourth load T12 is set as almost the same value as the second load T2 at the maximum engine speed N4 in the natural-aspiration A/F lean range A11. Note that a difference between the fourth load T12 and the second load T2 is small, and as illustrated in FIG. 12, the second lean range B2 and the fifth lean range C2 are set as almost the same range.

As illustrated in FIG. 13, in the natural-aspiration A/F lean range A11, the close timing EVC of the exhaust valve 12 is set to a more retarded side of the exhaust TDC. That is, in the natural-aspiration A/F lean range A11, the exhaust valve 12 is closed at or after the exhaust TDC. Thus, since the exhaust valve 12 is opened after the exhaust TDC, burnt gas once drawn out to the exhaust port 10 is fundamentally re-introduced into the combustion chamber 6 in the natural-aspiration A/F lean range A11.

As illustrated in FIG. 13, the close timing EVC of the exhaust valve 12 is set on the more advanced side as the engine load decreases in the fourth lean range C1 (i.e., the first lean range B1). In this embodiment, a relationship between the close timing EVC of the exhaust valve 12 and the engine load is linear, and the close timing EVC of the exhaust valve 12 is advanced as the engine load decreases.

On the other hand, as illustrated in FIG. 13, in the fifth lean range C2, the close timing EVC of the exhaust valve 12 is maintained at a given timing EVC1 on the retarded side of the exhaust TDC (hereinafter, may suitably be referred to as the "exhaust valve reference timing"), regardless of the engine load and the engine speed. This exhaust valve reference timing EVC1 is set as the same value as the close timing of the exhaust valve 12 when the engine load becomes the maximum in the fourth lean range C1 (when the engine load is the third load T11).

In the sixth lean range C3, the close timing EVC of the exhaust valve 12 is set on the more advanced side as the engine load increases. In this embodiment, a relationship between the close timing EVC of the exhaust valve 12 and the engine load becomes substantially linear, and the close timing EVC of the exhaust valve 12 is advanced as the engine load increases. The close timing EVC of the exhaust valve 12 when the engine load in the sixth lean range C3 is the lowest is set as the same value as the exhaust valve reference timing EVC1 described above.

Note that as illustrated in FIG. 13, in a partial range of the sixth lean range C3 where the engine load is higher, the close timing EVC of the exhaust valve 12 is fixed, regardless of the engine load, except for some engine speeds, (except for the first speed N1).

Note that as described above, the exhaust valve 12 is changed in the open and close timings while the opening period is fixed, the open timing of the exhaust valve 12 changes similar to the close timing EVC of the exhaust valve 12, according to the engine load and the engine speed.

Figure 14:
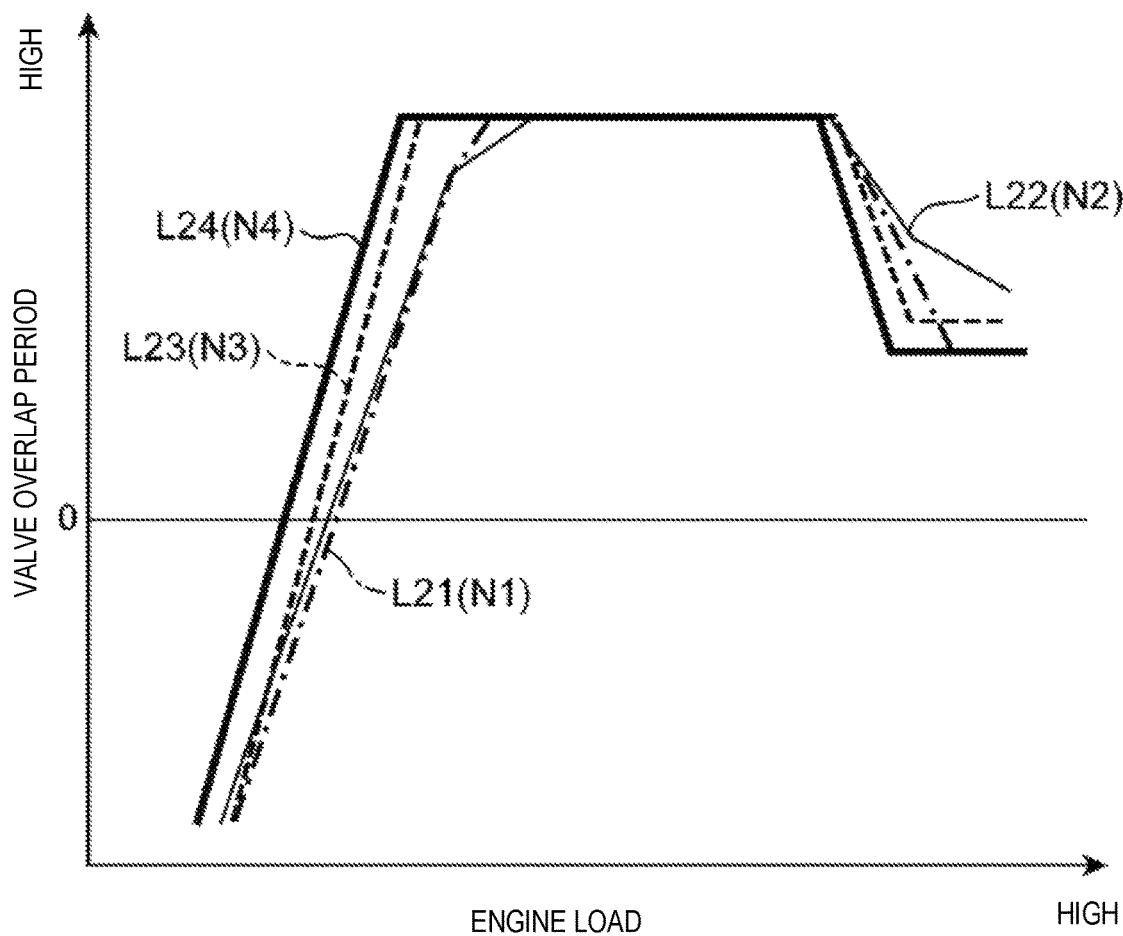
FIG. 14 is a graph illustrating one example of an overlap period of the intake valve and the exhaust valve which are set in the natural-aspiration A/F lean range.

Since the open timings and the close timings of the intake valve 11 and the exhaust valve 12 are set as described above, the overlap period of the intake valve 11 and the exhaust valve 12 is as illustrated in FIG. 14 in the natural-aspiration A/F lean range A11.

FIG. 14 is a graph in which the horizontal axis is the engine load and the vertical axis is the overlap period which is a period when both the intake valve 11 and the exhaust valve 12 are opened, and lines L21-L24 in FIG. 14 are curves illustrating the relationship between respective engine speeds N1-N4. The minus value in the vertical axis of FIG. 14 indicates the period during which both the intake valve 11 and the exhaust valve 12 are closed near the exhaust TDC.

As illustrated in FIG. 14, in the natural-aspiration A/F lean range A11, the overlap period becomes shorter as the engine load decreases within a range where the engine load is low (the first lean range B1 and the fourth lean range C1). In a range where the engine load is higher than this (the fifth lean range C2), the overlap period becomes constant regardless of the engine load, and in a range where the engine load is further higher (the sixth lean range C3), the overlap period becomes shorter than as the engine load increases.

(Reduced-Cylinder Operation)

Next, the open timings and the close timings of the intake valve 11 and the exhaust valve 12 during the reduced-cylinder operation are described.

First, a reduced-cylinder operation executing condition which is a condition for carrying out the reduced-cylinder operation in the reduced-cylinder operation switching range A20 is described.

When switching between the all-cylinder operation and the reduced-cylinder operation, the engine torque may vary by changing the number of operating cylinders. Thus, in this embodiment, in order to reduce the frequency of switching between the all-cylinder operation and the reduced-cylinder operation, even when the engine is operated in the reduced-cylinder operation switching range A20, the reduced-cylinder operation is carried out only when shifting from the reduced cylinder operating range A5 to the reduced-cylinder operation switching range A20, and then remaining in the reduced-cylinder operation switching range A20 after the transition. Therefore, even when the engine is operated in the reduced-cylinder operation switching range A20, the all-cylinder operation is carried out when shifting to the reduced-cylinder operation switching range A20 from a range other than the reduced cylinder operating range A5 and the reduced-cylinder operation switching range A20, and when remaining in the reduced-cylinder operation switching range A20 after the transition. Thus, in this embodiment, it is determined that the reduced-cylinder operation executing condition is satisfied, when shifting from the reduced cylinder operating range A5 to the reduced-cylinder operation switching range A20, when remaining in the reduced-cylinder operation switching range A20 after the transition, and when the reduced-cylinder operation is currently carried out.

Figure 15:
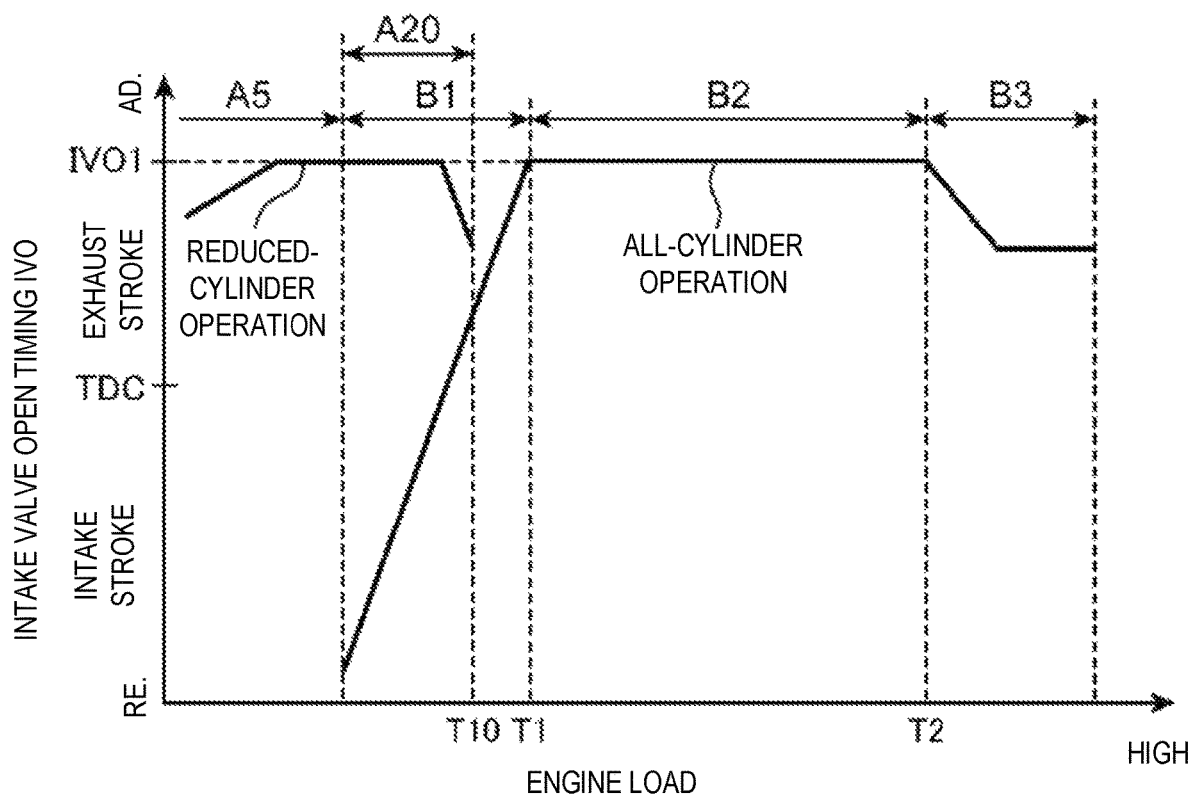
FIG. 15 is a graph illustrating one example of the open timing of the intake valve both during a reduced-cylinder operation and an all-cylinder operation.

FIG. 15 is a graph illustrating one example of the open timing IVO of the intake valve 11 in the reduced cylinder operating range A5, the open timing IVO of the intake valve 11 when the reduced-cylinder operation is carried out in the reduced-cylinder operation switching range A20, and the open timing IVO of the intake valve 11 when the all-cylinder operation is carried out in the first divided range A1. FIG. 15 illustrates one example when the engine speed is the third speed N3.

As illustrated in FIG. 15, the open timing IVO of the intake valve 11 during the reduced-cylinder operation (when operating in the reduced cylinder operating range A5 and when the reduced-cylinder operation is carried out in the reduced-cylinder operation switching range A20) is set to a timing at the advanced side of the exhaust TDC and near the most advanced timing IVO1. In connection with this, in the reduced-cylinder operation switching range A20, a varying range of the open timing IVO of the intake valve 11, i.e., a difference between the most advanced timing and the most retarded timing in the reduced-cylinder operation switching range A20 is set smaller during the reduced-cylinder operation than during the all-cylinder operation.

Moreover, in the reduced-cylinder operation switching range A20, and in a partial range of the first lean range B1 where the engine load is lower than the reduced-cylinder operation switching load T10, even when the engine speed and the engine load are the same, the open timing IVO of the intake valve 11 is more advanced during the reduced-cylinder operation than the all-cylinder operation.

Figure 16:
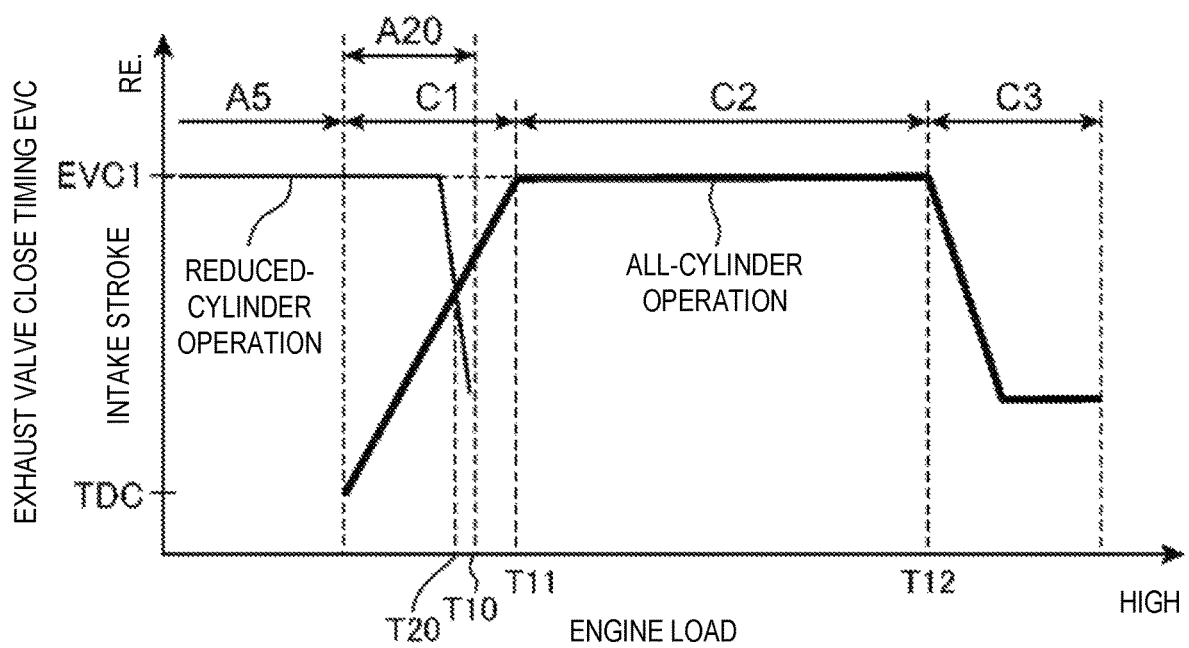
FIG. 16 is a graph illustrating one example of the close timing of the exhaust valve both during the reduced-cylinder operation and the all-cylinder operation.

FIG. 16 is a graph illustrating one example of the close timing EVC of the exhaust valve 12 in the reduced cylinder operating range A5, and the close timing EVC of the exhaust valve 12 when the reduced-cylinder operation is carried out in the reduced-cylinder operation switching range A20, and the close timing EVC of the exhaust valve 12 when the all-cylinder operation is carried out in the first divided range A1. FIG. 16 illustrates one example when the engine speed is the third speed N3.

As illustrated in FIG. 16, the close timing EVC of the exhaust valve 12 during the reduced-cylinder operation (when operating in the reduced cylinder operating range A5, and when the reduced-cylinder operation is carried out in the reduced-cylinder operation switching range A20) is also set to a more retarded side of the exhaust TDC, similar to the all-cylinder operation being carried out in the first lean range B1. Note that when the all-cylinder operation is carried out in the reduced-cylinder operation switching range A20 as described above, the close timing EVC of the exhaust valve 12 is more advanced as the engine load decreases. On the other hand, when the reduced-cylinder operation is carried out, the close timing EVC of the exhaust valve 12 is more retarded as the engine load decreases.

In detail, when the engine load is lower than a given load T20 that is lower than the reduced-cylinder operation switching load T10, the close timing EVC of the exhaust valve 12 is set at the most advanced valve close timing EVC1, and is set at a timing more on the retarded side during the reduced-cylinder operation than the all-cylinder operation. Moreover, until the engine load exceeds the given load T20, the close timing EVC of the exhaust valve 12 is set at a more retarded timing during the reduced-cylinder operation than the all-cylinder operation. On the other hand, in a range where the engine load is higher than the given load T20, the close timing EVC of the exhaust valve 12 is set at a more advanced timing during the reduced-cylinder operation than the all-cylinder operation, and the close timing EVC of the exhaust valve 12 is set at a more advanced timing as the engine load increases during the reduced-cylinder operation.

(4-2) Boosting A/F Lean Range

In a partial range of the first divided range A1, which is a range A12 outside the line T where the boost is performed by the booster 33 (hereinafter, may suitably be referred to as a boosting A/F lean range), the valve opening period of the intake valve 11 and the valve opening period of the exhaust valve 12 overlap with each other having a compression top dead center therebetween, and the open timing and the close timing of these valves 11 and 12 are set so that both the intake valve 11 and the exhaust valve 12 are opened during a period from a timing on the advanced side of a compression top dead center to a timing on the retarded side of the compression top dead center. By setting in this way, purge of the combustion chamber 6 is stimulated and a large amount of air is introduced into the combustion chamber 6.

(5) Setting of External EGR Rate

Next, the details of the external EGR performed in the first divided range A1 will be described.

Figure 17:
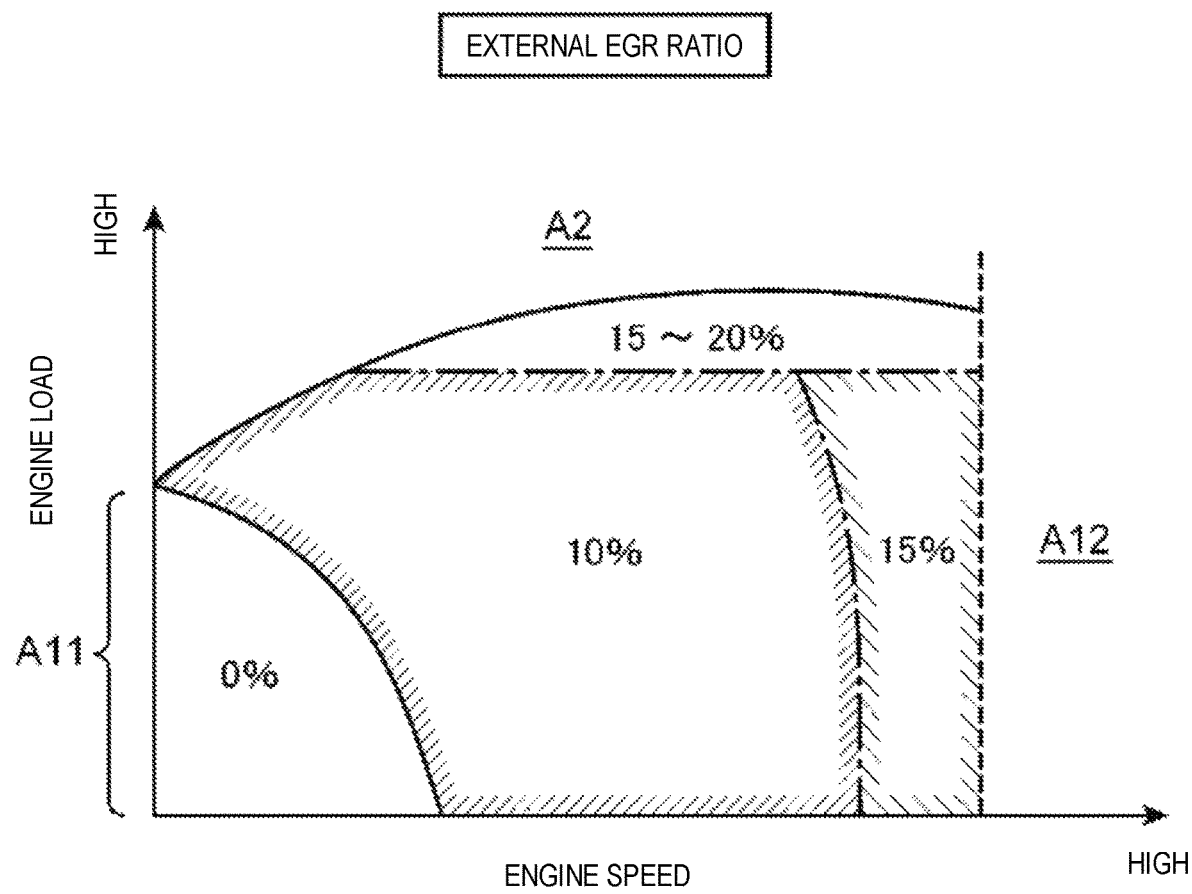
FIG. 17 is a graph illustrating one example of an external EGR rate set in a first operating range.

FIG. 17 is a graph illustrating one example of a target value of the external EGR rate set in the first divided range A1 (hereinafter, may also be referred to as the "target external EGR rate"). As illustrated in FIG. 17, in the first divided range A1, the target external EGR rate is variably set substantially within a range of 0 to 20%, and this value is set higher as the engine speed or the engine load increases. Note that the term "external EGR rate" as used herein refers to a weight ratio of exhaust gas which is recirculated to the combustion chamber 6 through the EGR passage 51 (external EGR gas) occupying in all the gas in the combustion chamber 6.

For example, in a lowest-speed and lowest-load range of the first divided range A1, the target external EGR rate is set to 0%. In a partial range of the first divided range A1 where the engine speed or the engine load is higher than the lowest-speed and lowest-load range, the target external EGR rate is set to 10%. In a partial range of the first divided range A1 where mainly the engine speed is higher than the 10% range, the target external EGR rate is set to 15%. In a partial range of the first divided range A1 where the engine load is the highest, the target external EGR rate is variably set within a range of 15 to 20%. For example, the target external EGR rate is set, in the 15 to 20% range of the first divided range A1 where the engine load is the highest, to a value close to 20% for higher load, and close to 15% for lower load.

The ECU 100 adjusts the opening of the EGR valve 53 so that, during operation in the first divided range A1, the external EGR gas amount corresponding to the target external EGR rate set as described above is recirculated to the combustion chamber 6 through the EGR passage 51.

(6) Swirl Control

The details of a swirl control in the first divided range A1 will be described.

In the first divided range A1, the opening of the swirl valve 18 is set as a low opening which is lower than a half-open (50%). Thus, by reducing the opening of the swirl valve 18, intake air introduced into the combustion chamber 6 is mostly comprised of intake air from the first intake port 9A (the intake port without the swirl valve 18), and a strong swirl flow is formed in the combustion chamber 6. This swirl flow grows during the intake stroke and remains up to the middle of the compression stroke to stimulate the stratifying of the fuel. That is, a concentration difference where the fuel concentration in the central part of the combustion chamber 6 is thicker than an area outside the central part (perimeter part) is formed. For example, in the first divided range A1, the air-fuel ratio in the central part of the combustion chamber 6 is set 20 or higher and 30 or lower by the action of the swirl flow, and the air-fuel ratio in the perimeter part of the combustion chamber 6 is set 35 or higher.

Figure 18:
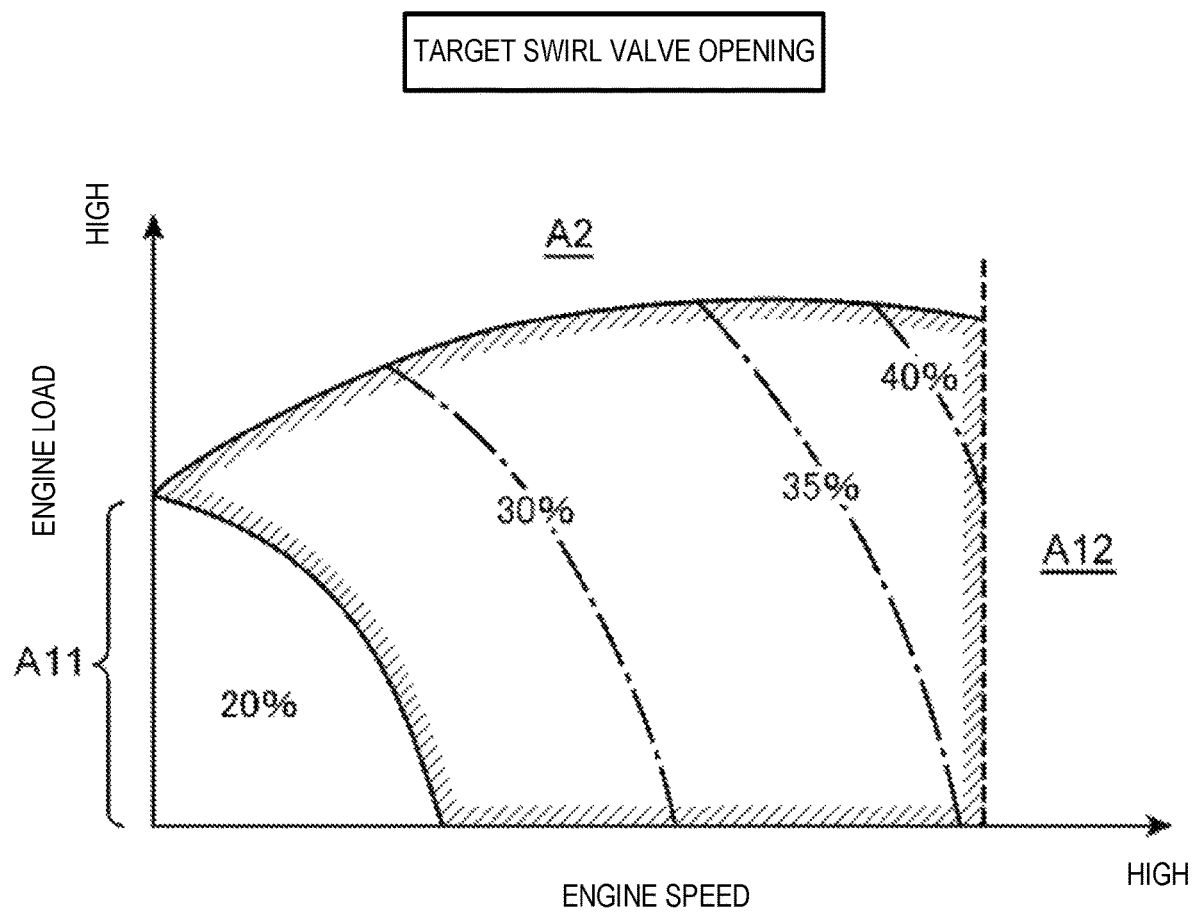
FIG. 18 is a graph illustrating one example of a target swirl valve opening set in the first operating range.

FIG. 18 is a graph illustrating one example of a target value of the opening of the swirl valve 18 set in the first divided range A1 (hereinafter, may be referred to as the "target swirl valve opening"). As illustrated in FIG. 18, in the first divided range A1, the target swirl valve opening is variably set substantially within a range of 20 to 40%, and this value is set higher as the engine speed or the engine load increases.

The ECU 100 controls the opening of the swirl valve 18 according to the map (FIG. 18) of the target swirl valve opening set as described above, during operation in the first divided range A1.

A stronger swirl flow is generated in the combustion chamber 6 as the opening of the swirl valve 18 is lower. In this embodiment where the map of FIG. 18 is used, since the opening of the swirl valve 18 is set lower during operation in the first divided range A1 as the engine speed and the engine load are lower, the swirl flow is strengthened accordingly (as the engine speed and the engine load become lower).

That is, in this embodiment, although fuel is radially injected from the injector 15 disposed in the central part of the ceiling surface of the combustion chamber 6, each fuel spray of the injected fuel is carried by the swirl flow and moves toward the central part of the combustion chamber 6. At this time, since the swirl flow remains until a later time of the compression stroke as the opening of the swirl valve 18 is smaller (in other words, as an initial velocity of the swirl flow is faster), the mixture gas with a higher fuel concentration is formed in the central part of the combustion chamber 6 immediately before a start of the combustion, and as a result, the stratification of the mixture gas is stimulated. Utilizing this, in this embodiment, the opening of the swirl valve 18 is reduced to strengthen the swirl flow as the engine speed and the engine load are lower in the first divided range A1, thereby improving the stratification and ignitionability of the mixture gas.

Here, when the opening of the swirl valve 18 in the engine of this embodiment is 40%, the swirl ratio slightly exceeds 1.5, and when the swirl valve 18 is fully closed (0%), the swirl ratio increases to about 6. Note that the swirl ratio is defined as a value obtained by dividing an integrated value of measurements of a lateral angular velocity of the intake air flow for every valve lift by an angular velocity of the crankshaft. As described above, the opening of the swirl valve 18 is controlled substantially within a range of 20 to 40% during operation in the first divided range A1 (see FIG. 18). Thereby, in this embodiment, it can be said that the opening of the swirl valve 18 in the first divided range A1 is set as the value so that the swirl ratio in the combustion chamber 6 becomes 1.5 or more.

(7) SI Ratio

As described above, in this embodiment, SPCCI combustion which is a combination of SI combustion and CI combustion is performed in the first divided range A1 and the second divided range A2, and in this SPCCI combustion, it is important to control a ratio of SI combustion and CI combustion according to the operating condition.

Here, in this embodiment, as this ratio, a SI ratio which is a ratio of the amount of heat generation by SI combustion to the total amount of heat generation by SPCCI combustion (SI combustion and CI combustion) is used. FIG. 6 is a view illustrating the SI ratio, and illustrates a change in a heat generation rate (J/deg) when SPCCI combustion occurs, according to the crank angle. A point X1 in the waveform of FIG. 6 is a heat generation point from which the heat generation rate rises with the start of SI combustion, and a crank angle θsi corresponding to the heat generation point X1 is defined as a start timing of SI combustion. Moreover, the point X2 in this waveform is a point of inflection which appears when the combustion mode changes from SI combustion to CI combustion, and the crank angle θci corresponding to this point of inflection X2 is defined as a start timing of CI combustion. Further, a waveform area R1 of the heat generation rate located at the advanced side of θci which is the start timing of CI combustion (from θsi to θci) is defined as an amount of heat generation by SI combustion, and a waveform area R2 of the heat generation rate located on the retarded side of θci is defined as an amount of heat generation by CI combustion. Thus, the SI ratio which is defined by [amount of heat generation by SI combustion]/[amount of heat generation by SPCCI combustion] described above can be expressed by R1/(R1+R2) using the areas R1 and R2. That is, in this embodiment, SI ratio=R1/(R1+R2).

In CI combustion, since the mixture gas combusts simultaneously by self-ignition, the pressure buildup rate tends to be higher, compared with SI combustion by flame propagation. For this reason, particularly, if the SI ratio is decreased (i.e., the ratio of CI combustion is increased) under a condition where the load is high and the fuel injection amount is large, loud noise will occur. On the other hand, since CI combustion does not occur unless the combustion chamber 6 fully increases in temperature and pressure, CI combustion will not be started under a condition where the load is low and the fuel injection amount is small unless SI combustion progresses to some extent, and therefore, the SI ratio becomes inevitably high (i.e., the ratio of CI combustion decreases). In consideration of such a situation, in this embodiment, the target SI ratio which is a target value of the SI ratio is defined beforehand for every engine operating condition in the operating range where SPCCI combustion is performed (i.e., the first and second divided ranges A1 and A2). For example, the target SI ratio in the first divided range A1 at the low load side is set so as to be substantially smaller as the load increases (i.e., the ratio of CI combustion increases as the load increases). On the other hand, the target SI ratio in the second divided range A2 at the high load side is set so as to be substantially larger as the load increases (i.e., the ratio of CI combustion decreases). Further, corresponding to this, in this embodiment, the target θci which is the start timing of CI combustion when combustion which suits the target SI ratio is performed is also defined beforehand for every engine operating condition.

In order to realize the target SI ratio and the target θci described above, it is necessary to adjust controlled variables, such as main timing of ignition by the spark plug 16, the injection amount/ injection timing of fuel from the injector 15, and the EGR rate (the external EGR rate and the internal EGR rate), for every operating condition. For example, more fuel combusts by SI combustion as the main timing of ignition is advanced, thereby increasing the SI ratio. Moreover, more fuel combusts by CI combustion as the injection timing of fuel is advanced, thereby decreasing the SI ratio. Alternatively, more fuel combusts by CI combustion as the in-cylinder temperature increases with an increase of the EGR rate, thereby decreasing the SI ratio. Further, since the change in the SI ratio is accompanied by the change in θci, a change in each controlled variable (the main ignition timing, the fuel injection timing, the EGR rate, etc.) serves as an element to adjust θci.

Based on the above tendencies, in this embodiment, the main ignition timing, the injection amount/injection timing of fuel, the EGR rate (as a result, the in-cylinder temperature), etc. are controlled to become a combination which can realize the target SI ratio and the target θci as described above, when performing SPCCI combustion.

(8) Operation and Effects

In this embodiment, in the first divided range A1 including the natural-aspiration A/F lean range A11, SPCCI combustion is performed, while the air-fuel ratio is set higher than the stoichiometric air-fuel ratio. Therefore, the fuel efficiency can certainly be improved.

Note that SI combustion tends to be unstable if the air-fuel ratio is increased. If SI combustion becomes unstable, the temperature in the combustion chamber 6 cannot be fully increased near a compression top dead center. Therefore, the amount of the mixture gas which carries out CI combustion decreases and a large amount of the mixture gas combusts by flame propagation with a long combustion period, or CI combustion takes place when the piston descends considerably, and as a result, fuel efficiency decreases.

In this regard, in this embodiment, in the second lean range B2, the open timing IVO of the intake valve 11 is set at a timing on the advanced side of the exhaust TDC to open the intake valve 11 in the middle of the exhaust stroke. Therefore, burnt gas inside the combustion chamber 6 is drawn out to the intake port 9, and this burnt gas can then flow into the combustion chamber 6, to increase the amount of burnt gas (internal EGR gas) which remains inside the combustion chamber 6. In the second lean range B2, the temperature of burnt gas is also high in connection with the high engine load. Therefore, by controlling the open timing IVO of the intake valve 11 as described above, a large amount of high-temperature burnt gas (internal EGR gas) can be remained in the combustion chamber 6 in the second lean range B2, thereby increasing the temperature in the combustion chamber 6 and improving the stability of SI combustion. If the stable SI combustion occurs, the pressure in the combustion chamber 6 can be increased by the combustion energy of SI combustion, and CI combustion of the mixture gas can be appropriately carried out near a compression top dead center (TDC). Therefore, the suitable CI combustion (SPCCI combustion) can be realized to improve fuel efficiency.

In particular, in this embodiment, the open timing IVO of the intake valve 11 is set at the most advanced timing IVO1, i.e., at the most advanced side timing which the open timing IVO can take with respect to the exhaust TDC in the second lean range B2. Therefore, in the second lean range B2, a large amount of burnt gas can be remained certainly inside the combustion chamber 6, and combustion stability can certainly be improved.

Moreover, in this embodiment, the close timing EVC of the exhaust valve 12 is set at the timing on the retarded side of the exhaust TDC in the second lean range B2. Therefore, burnt gas drawn out to the exhaust port 10 in the second lean range B2 can also be re-introduced into the combustion chamber 6, and more burnt gas (internal EGR gas) with a high temperature can be remain in the combustion chamber 6. Therefore, combustion stability can certainly be improved in the second lean range B2.

Moreover, in this embodiment, in the fifth lean range C2 set as substantially the same range as the second lean range B2, the close timing EVC of the exhaust valve 12 is maintained at the given timing EVC1 on the retarded side of the exhaust TDC, with the retarded amount being relatively large, regardless of the engine load. Therefore, a large amount of burnt gas can be introduced in the combustion chamber 6 more certainly, and controllability of the exhaust valve 12 can be suitable. That is, in a case where the close timing EVC of the exhaust valve 12 has to be changed largely with the change in the engine load, although the close timing EVC of the exhaust valve 12 may deviate from suitable timing due to a response delay of the variable exhaust mechanism 14a, etc., this can be prevented.

On the other hand, in the first lean range B1 (fourth lean range C1) where the engine load is low, the temperature of burnt gas is low in connection with the engine load being low. Therefore, in this first lean range B1, even if the amount of burnt gas which remains in the combustion chamber 6 is increased similar to the second lean range B2, the temperature in the combustion chamber 6 may not fully be increased.

In this regard, in this embodiment, the close timing IVC of the intake valve 11 in the first lean range B1 is controlled so that it is a timing within a range on the retarded side of the intake BDC, even further retarded when the engine load decreases. That is, in the first lean range Bl, the retarded amount of the close timing IVC of the intake valve 11 from the intake BDC is increased as the engine load decreases. Further, the rate of change in the close timing IVC of the intake valve 11 in the first lean range B1 is increased (making it larger than the rate of change in the second lean range B2) to fully increase the retarded amount of the close timing IVC of the intake valve 11 from the intake BDC when the engine load is low. As the retarded amount of the close timing IVC of the intake valve 11 from the intake BDC is increased, an amount of air which is blown back to the intake port 9 from the combustion chamber 6 through the intake valve 11 in connection with the ascent of the piston 5 after the intake BDC increases.

Therefore, by controlling the close timing IVC of the intake valve 11 as described above, in the low load side of the first lean range B1 (in the part where the engine load is low), the amount of air blown back to the intake port 9 from the combustion chamber 6 can be increased to reduce the air-fuel ratio in the combustion chamber 6 (richer) to bring it closer to the stoichiometric air-fuel ratio, thereby realizing the suitable CI combustion (SPCCI combustion) where the stability of SI combustion and the stability of CI combustion are increased. Moreover, in the high load side of the first lean range B1 (in the part where the engine load is high), the relatively large amount of hot burnt gas remains in the combustion chamber 6 to secure the combustion stability, and the amount of air blown back to the intake port 9 is lessened to make the air-fuel ratio lean, thereby improving fuel efficiency.

Moreover, in this embodiment, in the fourth lean range C1 and the first lean range B1, the close timing EVC of the exhaust valve 12 is advanced within the range on the retarded side of the exhaust TDC as the engine load decreases.

Here, when the close timing EVC of the exhaust valve 12 is advanced within the range on the retarded side of the exhaust TDC, the amount of burnt gas (internal EGR gas) re-introduced into the combustion chamber 6 after being drawn out to the exhaust port 10 decreases. Therefore, by controlling the close timing EVC of the exhaust valve 12 as described above, in the low load sides of the fourth lean range C1 and the first lean range B1, the amount of burnt gas (internal EGR gas) which remains in the combustion chamber 6 is reduced to prevent the burnt gas impeding the reaction of fuel and air. Therefore, combustion stability can further be improved. Moreover, in the high load sides of the fourth lean range C1 and the first lean range B1, the relatively hot burnt gas (internal EGR gas) remains moderately in the combustion chamber 6 in connection with the engine load being relatively high, thereby increasing the in-cylinder temperature to improve combustion stability.

Moreover, in this embodiment, it is possible to carry out the reduced-cylinder operation when operating in the reduced-cylinder operation switching range A20 set to the part at the low load side of the first lean range B 1. Therefore, combustion stability can certainly be improved in this range. For example, in the reduced-cylinder operation, the amount of fuel supplied to one cylinder (the operating cylinder) under the condition where the engine load is the same is increased more than that in the all-cylinder operation. Therefore, the temperature in the operating cylinder is increased to stabilize the combustion.

In this way, when carrying out the reduced-cylinder operation, since the combustion stability in the low load side of the first lean range B1 can be improved by reducing the number of operating cylinders, the necessity of adjusting the open timings and the close timings of the intake valve 11 and the exhaust valve 12 in order to increase combustion stability becomes less, as described above. On the other hand, in this embodiment, when carrying out the reduced-cylinder operation in the low load side of the reduced-cylinder operation switching range A20, since the open timings and the close timings of the intake valve 11 and the exhaust valve 12 are set constant, the controllability of the intake valves 11 and the exhaust valves 12 can be suitable, while improving combustion stability by the reduced-cylinder operation. This becomes advantageous when the operating state and the environmental condition are changed, as well as when realizing the partial compression-ignition combustion. That is, it also becomes advantageous when the operating state and the environmental condition are changed, as well as realizing SPCCI combustion.

Here, it is necessary to also increase the amount of air introduced into the operating cylinders because of the amount of the fuel supplied to the combustion chamber 6 being increased when the engine load is relatively high in the reduced-cylinder operation. On the other hand, in this embodiment, when the reduced-cylinder operation is carried out within the higher load range of the reduced-cylinder operation switching range A20, the open timing IVO of the intake valve 11 is controlled to be on the retarded side within a range on the advanced side of the exhaust TDC as the engine speed increases. Therefore, within the higher load range of the reduced-cylinder operation switching range A20, the amount of burnt gas re-introduced into the operating cylinders after once being flowed into the intake ports is reduced to stimulate the introduction of air, thereby more certainly introducing the suitable amount of air into the operating cylinders.

Moreover, in the embodiment, when performing SPCCI combustion, since the main timing of ignition by the spark plug 16 is adjusted so that the SI ratio which is the ratio of the amount of heat generation by SI combustion to the total amount of heat generation in one cycle becomes in agreement with the preset target SI ratio according to the engine operating condition, the ratio of CI combustion can be increased as much as possible (i.e., the SI ratio is lowered) within a range where, for example, combustion noise does not become excessive. This leads to improving thermal efficiency by SPCCI combustion as much as possible.

(9) Modifications

Moreover, in the embodiment, although the SI ratio which is the ratio of the amount of heat generation by SI combustion to the total amount of heat generation by SPCCI combustion is defined as R1/(R1+R2) by using the areas R1 and R2 in the combustion waveform of FIG. 6, and the main timing of ignition is adjusted so that the SI ratio become in agreement with the preset target SI ratio, other various methods of defining the SI ratio can be considered.

For example, the SI ratio may be as follow.

SI ratio=R1/R2

Figure 19:
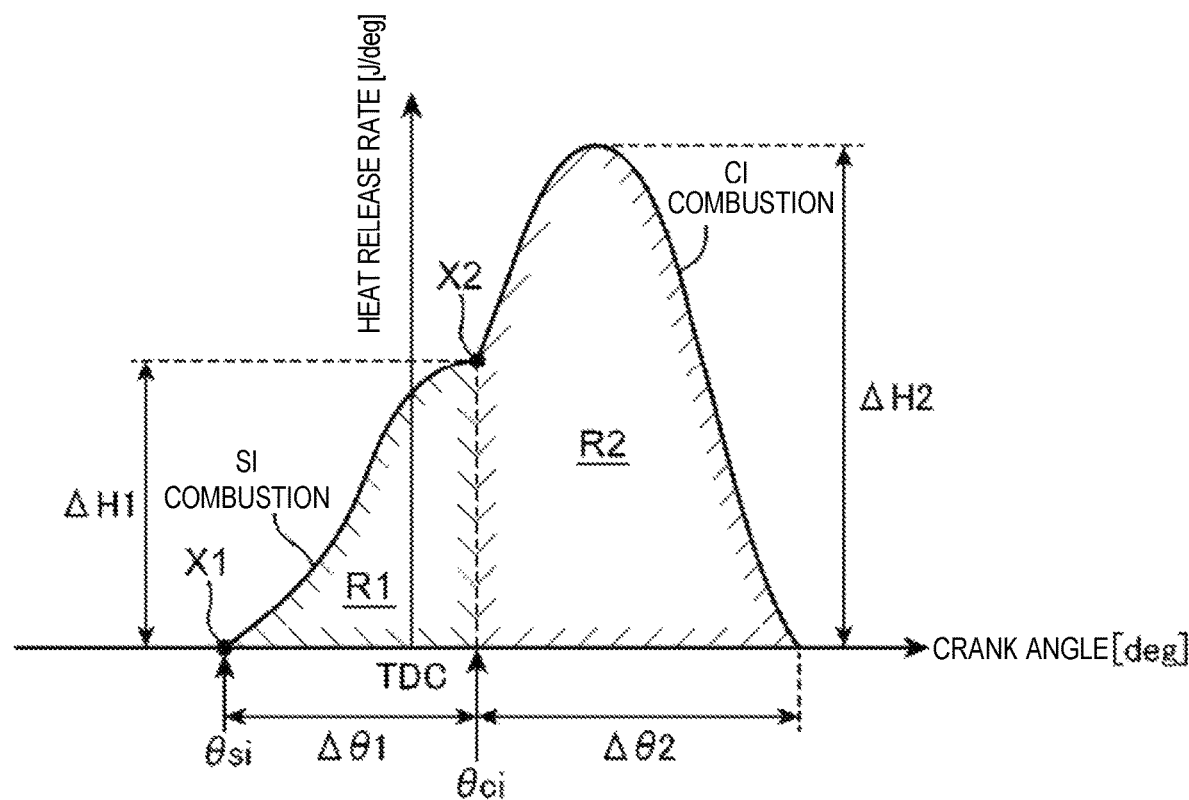
FIG. 19 is a view corresponding to FIG. 6, illustrating various methods of defining an SI ratio.

Further, the SI ratio may be defined using $\Delta\theta1$ and $\Delta\theta2$ which are illustrated in FIG. 19. That is, when the crank angle period of SI combustion (a combustion period on the advanced side of the point of inflection X2) is set as $\Delta\theta1$, and the crank angle period of CI combustion (a combustion period at the retarded side of the point of inflection X2) is set as $\Delta\theta2$, the SI ratio may be as follows.

SI ratio=$\Delta\theta1/(\Delta\theta1+\Delta\theta2)$ or

SI ratio=$\Delta\theta1/\Delta\theta2$

Alternatively, when a peak of the heat generation rate of SI combustion is set as $\Delta H1$, and a peak of the heat generation of CI combustion is set as $\Delta H2$, the SI ratio may be as follow.

SI ratio=$\Delta H1/(\Delta H1+\Delta H2)$ or

SI ratio=$\Delta H1/\Delta H2$

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

2 Cylinder
11 Intake Valve
12 Exhaust Valve
13a Intake VVT (Intake Variable Mechanism)
14a Exhaust VVT (Exhaust Variable Mechanism)
15 Injector
16 Spark plug
30 Intake Passage
40 Exhaust Passage
100 ECU (Controller)

What is claimed is:

1. A control system of a compression-ignition engine including a cylinder, an intake passage, an exhaust passage, an intake port communicating the intake passage to the cylinder, an intake valve configured to open and close the intake port, an exhaust port communicating the exhaust passage to the cylinder, an exhaust valve configured to open and close the exhaust port, an injector configured to inject fuel into the cylinder, and a spark plug configured to ignite a mixture gas containing the fuel injected by the injector and air, the engine executing partial compression-ignition combustion in which the mixture gas is spark-ignited with the spark plug to be partially combusted by spark ignition (SI) combustion and the remaining mixture gas self-ignites to be combusted by compression ignition (CI) combustion, comprising:

an intake variable mechanism configured to change an open timing and a close timing of the intake valve; and a controller including a processor configured to control parts of the engine, including the intake variable mechanism and the spark plug, wherein the controller controls the intake variable mechanism so that, when the engine is operated in a given second operating range, an air-fuel ratio (A/F) lean environment where an air-fuel ratio that is a ratio of air to fuel in the cylinder becomes higher than a stoichiometric air-fuel ratio is formed, and the open timing of the intake valve is at an advanced side of an exhaust top dead center, while causing the spark plug to perform the spark ignition at a given timing so that the mixture gas combusts by the partial compression-ignition combustion, and wherein the controller controls the intake variable mechanism so that, when the engine is operated in a first operating range where the engine load is lower than that of the second operating range, the A/F lean environment where the air-fuel ratio becomes higher than the stoichiometric air-fuel ratio is formed, while causing the spark plug to perform the spark ignition at given timing so that the mixture gas combusts by the partial compression-ignition combustion, and the controller controls the intake variable mechanism so that, under the same engine speed condition, the close timing of the intake valve is more retarded within a range on a retarded side of an intake bottom dead center as the engine load decreases, and an absolute value of a rate of change in the close timing of the intake valve to the engine load becomes larger than an absolute value of the rate of change in the second operating range.

2. The control system of claim 1, wherein the intake variable mechanism simultaneously changes the open timing and the close timing of the intake valve.

3. The control system of claim 1, wherein the controller controls the intake variable mechanism so that the open timing of the intake valve is maintained at or near a most advanced timing with respect to the exhaust top dead center in the second operating range, regardless of the engine load.

4. The control system of claim 1, further comprising an exhaust variable mechanism configured to change a close timing of the exhaust valve,
wherein the controller controls the exhaust variable mechanism so that, when the engine is operated in a third operating range set as a low load side of the operating range where the partial compression-ignition combustion under the A/F lean environment is performed, the close timing of the exhaust valve is more advanced within a range on a retarded side of the exhaust top dead center as the engine load decreases.

5. The control system of claim 4, wherein the controller controls the exhaust variable mechanism so that, when the engine is operated in a fourth operating range where the engine load is higher than the third operating range, of the operating range where the partial compression-ignition combustion under the A/F lean environment is performed, the close timing of the exhaust valve is maintained at a substantially constant timing on the retarded side of the exhaust top dead center, regardless of the engine load.

6. The control system of claim 5, wherein the controller controls the exhaust variable mechanism so that, when the engine is operated in a fifth operating range where the engine load is higher than the fourth operating range, of the operating range where the partial compression-ignition combustion under the A/F lean environment is performed, the close timing of the exhaust valve is more advanced within a range on the retarded side of the exhaust top dead center as the engine load increases.

7. The control system of claim 5, wherein
the first operating range and the second operating range are adjacent to each other in an engine load direction, bordering on a given first reference load,
the third operating range and the fourth operating range are adjacent to each other in the engine load direction, bordering on a given second reference load, and
the first reference load and the second reference load are set substantially identical.

8. The control system of claim 1, wherein
the cylinder includes a plurality of cylinders, and
the controller carries out, when the engine is operated in a reduced cylinder range set as a low load side of the first operating range, and a preset reduced-cylinder operation executing condition is satisfied, a reduced-cylinder operation in which only some of the cylinders are operated by injecting fuel from the injector into the cylinders, while suspending the fuel injection into the remaining cylinders, and controls the intake variable mechanism so that, when the reduced-cylinder operation is carried out within a lower load range of the reduced cylinder range, the close timing of the intake valve is fixed, regardless of the engine load.

9. The control system of claim 8, wherein the controller controls an exhaust variable mechanism configured to change a close timing of the exhaust valve so that, when the reduced-cylinder operation is carried out within a lower load range of the reduced cylinder range, the close timing of the exhaust valve is fixed, regardless of the engine load.

10. The control system of claim 1, wherein the controller sets a target SI ratio that is a target value of a ratio of an amount of heat generation by SI combustion to a total amount of heat generation in one cycle according to an engine operating condition when performing the partial compression-ignition combustion, and sets an ignition timing of the spark plug based on the target SI ratio.

* * * * *